US011879269B2

(12) United States Patent
Bullwinkel et al.

(10) Patent No.: US 11,879,269 B2
(45) Date of Patent: Jan. 23, 2024

(54) RATCHET LOCK ASSEMBLIES

(71) Applicant: Delta Lock Company, LLC, Bohemia, NY (US)

(72) Inventors: William H. Bullwinkel, Farmingdale, NY (US); Robert Ludwig, Newton, NJ (US); David R. Wachsman, Palm Beach Gardens, NY (US); Alvin Ma, Irvine, CA (US)

(73) Assignee: Innovation Lock, LLC, Palm Beach Gardens, FL (US)

( * ) Notice: Subject to any disclaimer, the term of this patent is extended or adjusted under 35 U.S.C. 154(b) by 24 days.

(21) Appl. No.: 17/536,213

(22) Filed: Nov. 29, 2021

(65) Prior Publication Data

US 2022/0356734 A1 Nov. 10, 2022

Related U.S. Application Data

(60) Provisional application No. 63/186,234, filed on May 10, 2021.

(51) Int. Cl.

*E05B 55/00* (2006.01)
*E05B 9/04* (2006.01)
*E05B 63/00* (2006.01)

(52) U.S. Cl.

CPC .............. *E05B 55/005* (2013.01); *E05B 9/04* (2013.01); *E05B 63/0056* (2013.01)

(58) Field of Classification Search

CPC .......... E05B 55/00; E05B 55/005; E05B 9/00; E05B 9/04; E05B 9/20; E05B 27/00;

(Continued)

(56) References Cited

U.S. PATENT DOCUMENTS

| | | | |
|---|---|---|---|
| 100,738 A | 3/1870 | Dwight | |
| 884,260 A | 4/1908 | Boyd | |

(Continued)

FOREIGN PATENT DOCUMENTS

| | | | |
|---|---|---|---|
| DE | 3233976 | C1 | 8/1983 |
| WO | 8300353 | A1 | 2/1983 |

OTHER PUBLICATIONS

Olympus Ratchet Lock, posted Dec. 13, 2008 [online], [retrieved Feb. 27, 2023]. Retrieved from internet, https://www.arnazon.com/Olympus-Sliding-Ratchet-Keyed-Different/dp/B005WL056Q (Year: 2008).

(Continued)

*Primary Examiner* — Nathan Cumar

(74) *Attorney, Agent, or Firm* — Michael J Porco; Gerald E Hespos

(57) ABSTRACT

Ratchet lock assemblies for use with various locking actuation members such as, but not limited to, lock cylinders of interchangeable core cylinder types are provided. In one embodiment, a ratchet lock assembly includes a plunger barrel with at least one projection extending therefrom. The at least one projection configured to mate with at least one aperture of a locking bar or strike plate to lock the ratchet lock assembly in place. In another embodiment, a ratchet lock assembly is provided with an anti-shim configuration to prevent unwanted removal of the ratchet lock assembly. The anti-shim ratchet lock assembly includes a driver and cam to lock a member, e.g., a spring, of the ratchet lock assembly to a locking bar or strike plate.

20 Claims, 18 Drawing Sheets

(58) Field of Classification Search
CPC ...... E05B 27/0014; E05B 29/00; E05B 63/00; E05B 63/0056; E05B 15/00; E05B 15/024; E05B 35/00; E05B 35/083
USPC ............................................................ 70/449
See application file for complete search history.

(56) References Cited

U.S. PATENT DOCUMENTS 1,342,728 A 6/1920 Welch
1,539,301 A 5/1925 Cooper
1,864,883 A 6/1932 Edward
1,938,112 A 12/1933 Schlage
1,965,336 A 7/1934 Fitz
2,032,821 A 3/1936 Carral
2,140,066 A 12/1938 White
2,275,362 A 3/1942 Golden et al.
2,720,102 A 10/1955 Spain
2,938,373 A 5/1960 Gray et al.
3,262,292 A 7/1966 Glass
3,340,709 A 9/1967 Callahan
3,345,838 A 10/1967 Russell et al.
3,423,968 A 1/1969 Foote
3,503,233 A 3/1970 Russell et al.
3,563,593 A 2/1971 Leier et al.
3,589,152 A 6/1971 Glass et al.
3,696,647 A 10/1972 Balicki
3,726,115 A 4/1973 Wellekens
3,863,475 A 2/1975 Foss
3,933,015 A 1/1976 Balicki
4,003,227 A * 1/1977 Casey .................. E05B 13/002 70/14
4,009,599 A 3/1977 Patriquin
4,067,599 A 1/1978 Ohno
4,356,580 A 11/1982 Kurtz
4,418,554 A 12/1983 Wolfgang
4,476,699 A 10/1984 Dahlborg
4,565,080 A 1/1986 Kincaid et al.
4,617,810 A * 10/1986 Fish .................... E05B 65/0894 70/14
4,630,457 A 12/1986 Kincaid et al.
4,672,827 A 6/1987 Craig
4,708,006 A 11/1987 Hodgson
4,756,638 A 7/1988 Neyret
4,768,360 A 9/1988 Foshee
4,793,163 A 12/1988 MacFarlane et al.
4,809,525 A 3/1989 Cox
4,899,563 A 2/1990 Martin
4,920,774 A 5/1990 Martin
5,010,753 A 4/1991 Boris
5,038,589 A 8/1991 Martin
5,101,649 A 4/1992 Duval
5,121,619 A 6/1992 Martin
5,127,244 A 7/1992 Myers
5,251,467 A 10/1993 Anderson
5,255,544 A 10/1993 Wu
5,315,850 A 5/1994 Edeus et al.
5,345,794 A 9/1994 Jenks
5,492,206 A 2/1996 Shieh
5,499,518 A 3/1996 Shieh
5,548,981 A 8/1996 Kirk
5,590,555 A 1/1997 Kester et al.
5,615,566 A 4/1997 Brandt
5,657,652 A 8/1997 Martin
5,678,438 A 10/1997 Kolkman et al.
5,722,275 A 3/1998 Price et al.
5,737,950 A 4/1998 Yun-Bin
5,813,260 A 9/1998 Widen
5,819,889 A 10/1998 Shieh
5,873,272 A 2/1999 Thompson
5,913,907 A 6/1999 Lee
5,970,760 A 10/1999 Shen
6,035,673 A 3/2000 Harrison
6,079,241 A 6/2000 Burleigh et al.
6,092,402 A 7/2000 Porcelli et al.
6,161,404 A 12/2000 Westwinkel
6,393,882 B1 5/2002 Higgins
6,523,379 B2 2/2003 Teskey
6,606,890 B1 8/2003 Widen
6,708,539 B1 3/2004 Widen
6,920,770 B2 7/2005 Lurie et al.
D525,110 S 7/2006 Beard et al.
RE39,364 E 10/2006 Brandt
7,178,372 B1 2/2007 Shen
7,308,809 B2 12/2007 Lu
7,340,928 B2 3/2008 Hoffman
RE41,188 E 4/2010 Lurie et al.
7,695,031 B2 4/2010 Jackson, Jr. et al.
7,716,958 B2 5/2010 Martin
7,836,735 B2 11/2010 Liu
7,849,720 B2 12/2010 Reese
7,874,189 B2 1/2011 Martin
7,895,867 B2 3/2011 Hsieh
7,918,111 B2 4/2011 Uliano
8,028,555 B2 10/2011 Lurie
D651,889 S 1/2012 Mahaffey et al.
D667,286 S 9/2012 Wu
D670,993 S 11/2012 Lin
8,444,100 B2 5/2013 Takahashi et al.
8,646,297 B2 2/2014 Foti
8,776,557 B2 7/2014 Wang
8,842,422 B2 9/2014 Hung et al.
8,905,693 B2 12/2014 Coffland et al.
8,919,156 B1 12/2014 Liu
8,978,426 B2 3/2015 Wang
9,167,918 B2 10/2015 Leyden
9,234,369 B2 1/2016 Gupta et al.
9,267,310 B2 2/2016 Linnåsen et al.
9,435,144 B2 9/2016 Bullwinkel
9,524,626 B2 12/2016 Brühwiler et al.
9,593,509 B2 3/2017 Murray
D789,770 S 6/2017 Reeb et al.
9,816,289 B2 11/2017 Bullwinkel
10,087,653 B2 10/2018 Bullwinkel
10,156,088 B2 12/2018 Bullwinkel et al.
10,184,270 B2 1/2019 Bullwinkel
D840,212 S 2/2019 Huang et al.
10,208,510 B1 2/2019 Dyck
10,435,914 B2 10/2019 Ma
10,662,672 B2 5/2020 Bullwinkel
10,724,276 B2 7/2020 Ma et al.
D899,218 S 10/2020 Bullwinkel et al.
11,603,680 B2 3/2023 Ma et al.
D988,835 S 6/2023 Bullwinkel et al.
2001/0045114 A1 11/2001 Sokurenko
2003/0019258 A1 1/2003 Irgens et al.
2005/0011237 A1 1/2005 Lurie et al.
2005/0011239 A1 1/2005 Lurie et al.
2005/0241348 A1 11/2005 Devecki
2005/0271494 A1 12/2005 Hidalgo et al.
2005/0279894 A1 12/2005 Sedon et al.
2006/0086162 A1 4/2006 Huang
2006/0157431 A1 7/2006 Nagelski et al.
2007/0175246 A1 8/2007 Hsai
2007/0227209 A1 10/2007 Massard et al.
2009/0071209 A1 3/2009 Lurie
2010/0031717 A1 2/2010 Lurie et al.
2010/0212371 A1 8/2010 Foti
2011/0127795 A1 6/2011 Still et al.
2011/0132047 A1 6/2011 Terhaar et al.
2011/0316325 A1 12/2011 Martin, III et al.
2013/0105419 A1 5/2013 Kologe
2014/0013813 A1 1/2014 Le
2014/0037399 A1 2/2014 Hyatt
2014/0298869 A1 10/2014 Wang
2015/0176307 A1* 6/2015 Bullwinkel ......... E05B 15/0046 70/382
2016/0281393 A1 9/2016 Bullwinkel et al.
2017/0298651 A1 10/2017 Ma
2017/0350163 A1 12/2017 Ma et al.
2018/0038132 A1 2/2018 Bullwinkel
2019/0145126 A1 5/2019 Wolfish et al.

(56) References Cited

U.S. PATENT DOCUMENTS

| | | | |
|---|---|---|---|
| 2021/0246935 | A1 | 8/2021 | Grewell et al. |
| 2022/0356734 | A1 | 11/2022 | Bullwinkel et al. |

OTHER PUBLICATIONS

U.S. Appl. No. 29/673,492, filed Dec. 14, 2018, William H. Bullwinkel.
U.S. Appl. No. 29/782,823, filed May 10, 2021, William H. Bullwinkel.
Compx Timberline, Locks & File Frame for wood furniture & cabinets, Catalog #0816, Copyright 2016, pp. 1-36.
Gear Lock DL37, Data Sheet, Kenstan Lock Company, Feb. 2020, one (1) page.
Rollok Rolling Doors & Security Shutters, Product Catalog, access at https://cdn.thomasnet.com/ccp/30841252/258644.pdf; Nov. 11, 2017; pp. 1-16.

* cited by examiner

RATCHET LOCK ASSEMBLIES

PRIORITY

This application claims priority to U.S. Provisional Patent Application Ser. No. 63/186,234, filed May 10, 2021, the contents of which are hereby incorporated by reference in its entirety.

TECHNICAL FIELD

The present disclosure relates generally to lock mechanisms, and more particularly, to ratchet lock assemblies for use with various locking actuation members such as, but not limited to, lock cylinders of interchangeable core cylinder types.

BACKGROUND

Numerous types of cylinders for locks are known and popularly used for various applications. For example, locks known in the industry as "interchangeable core cylinder" locks are used to provide a lock wherein the core cylinder can be removed from the lock housing through the use of a control key. A different interchangeable core cylinder can then be inserted into the lock housing, whereby the user can quickly and easily change a lock or locks without calling a locksmith.

One such type of locking device that may utilize an interchangeable core cylinder, or any other type of locking actuation member, is a ratchet type locking device employed in a sliding glass door of a display cabinet application. Typically, a ratchet type locking device includes a locking device and a bar or strike, that may include a plurality of teeth. The bar or strike is applied to one of the sliding glass doors and then the locking device is disposed over the bar, where the locking device makes contact with the other, second sliding glass door locking the sliding doors in place. Typically, the locking device includes a spring, or other mechanism, disposed in a housing of the locking device that interacts with the teeth of the bar or strike to lock the two components in place thus locking the sliding glass doors.

However, the conventional ratchet locking device may be easily bypassed or comprised unlocking the locking device and enabling access to the display cabinet. A bypass of the ratchet locking device occurs when the lock is comprised without affecting the integrity of the lock cylinder, i.e., defeating the lock through unlatching the underlying locking mechanism without operating the lock at all. For example, to shim a lock is a method of entry in which the key mechanism of the lock is bypassed with a tool or device to gain access or otherwise disengage the lock. In a ratchet locking device, a tool such as a shim may be used to engage the spring in the housing to disengage the spring from the teeth of the bar or strike thus enabling the locking device to be removed from the bar or strike.

Therefore, a need exists for ratchet type lock assemblies that cannot be easily removed, for example, with a simple shim.

SUMMARY

Ratchet lock assemblies for use with various locking actuation members such as, but not limited to, lock cylinders of interchangeable core cylinder types are provided.

According to one aspect of the present disclosure, a plunger-type ratchet locking device is provided including a housing including a first end and a second end, the housing extending from the first end to the second end along a longitudinal axis, the housing further including an outer wall defining a hollow interior of the housing; a barrel including a first end and a second end, the second end of the barrel disposed through the first end of the housing into the hollow interior of the housing such that the barrel is slidable along the longitudinal axis, the barrel further including an outer wall defining a hollow interior, the first end of the barrel configured to receive a locking actuation member such that the locking actuation member is retained in the hollow interior of the barrel; an elastic member, e.g., a spring, to bias the barrel toward the first end of the housing; and a projection coupled to the second end of the barrel, wherein when the barrel is moved toward the second end of the housing, the projection is configured to mate with a locking bar disposed in the second end of the housing.

In one aspect, the locking bar includes a serrated edge and the projection includes at least one corresponding tooth.

In another aspect, the second end of the housing includes a recess, the recess configured to retain a resilient detent, the resilient detent configured to properly align the locking bar disposed in the second end of the housing.

In a further aspect, the locking bar includes a serrated edge and the projection is configured in a triangular shape.

In another aspect, the locking bar includes at least one aperture and the projection is configured in a triangular shape, where the projection is disposed in the at least one aperture in a locked state.

In a further aspect, the locking bar includes at least one aperture and the projection is configured in a rectangular shape, where the projection is disposed in the at least one aperture in a locked state.

In yet another aspect, the locking bar includes at least one aperture and the projection is configured in a cylindrical shape, where the projection is disposed in the at least one aperture in a locked state.

In still another aspect, the locking bar includes at least one aperture and the projection is configured in a corresponding shape of the at least one aperture, where the projection is disposed in the at least one aperture in a locked state.

In one aspect, the housing further includes a member which extends perpendicularly to the longitudinal axis of housing and a first bumper coupled to the member, the member and bumper configured to stabilize the locking device when mounted to a sliding glass door of a display cabinet.

In a further aspect, the first bumper is removable and replaceable with a second bumper having a different width than a width of the first bumper.

In another aspect, the second end of the housing includes at least two recesses and the locking device further comprising a plate disposed over the second end of the housing creating a passageway with the recesses to receive the locking bar.

In a further aspect, the plate includes an aperture configured to receive at least a portion of the projection when the barrel is slidably advanced along the longitudinal axis toward the second end of the housing.

In another aspect, the projection is repositionably coupled to the send end of the barrel.

In one aspect, the locking actuation member is an interchangeable core, a fixed cylinder, a key removable core (KRC) and/or a tubular core.

According to another aspect of the present disclosure, an anti-shim ratchet locking assembly is provided including a housing including a front portion and a rear portion, the front portion including an aperture revealing an interior of the housing, the rear portion including a recess; a locking actuation member disposed through the aperture and mounted within the interior of the housing, the locking actuation member including a keyway; a locking bar received by the recess of the housing, the locking bar including a serrated edge; a spring configured such that, in an unbiased state, the spring selectively engages the serrated edge of the locking bar; a first driver coupled to the locking actuation member and including a first cam; and a second driver including a first surface and a second surface, the first surface opposite to the second surface, the first surface including a groove configured to receive the first cam, the second surface including a second cam and a third cam extending therefrom, wherein when an operating key is inserted into the keyway and rotated the first cam rides in the groove of the second driver to rotate the second driver and, when the second driver is rotated in a first direction, the second cam makes contact with the spring to bias the spring into the serrated edge of the locking bar securing the locking bar to the housing, and when the second driver is rotated in a second direction, the third cam makes contact with the spring to bias the spring away from the serrated edge of the locking bar to allow the locking bar to be withdrawn from the housing.

In one aspect, the second cams is a wedge-shaped cam, a tapered end of the wedge-shaped cam being urged under an edge of the elastic member wherein the edge rides on an upper tapered surface of the second cam until the edge is locked into a tooth of the locking bar and held in place by the second cam.

In another aspect, the third cam is a semicircular-shaped cam, the semicircular side of the third cam engages the elastic member to bias the edge of the elastic member from the serrated edge allowing unlocking of the locking mechanism.

BRIEF DESCRIPTION OF THE DRAWINGS

The above and other aspects, features, and advantages of the present disclosure will become more apparent in light of the following detailed description when taken in conjunction with the accompanying drawings in which.

It should be understood that the drawings are for purposes of illustrating the concepts of the disclosure and are not necessarily the only possible configuration for illustrating the disclosure.

DETAILED DESCRIPTION

Preferred embodiments of the present disclosure will be described hereinbelow with reference to the accompanying drawings. In the following description, well-known functions or constructions are not described in detail to avoid obscuring the present disclosure in unnecessary detail.

Figure 1A:
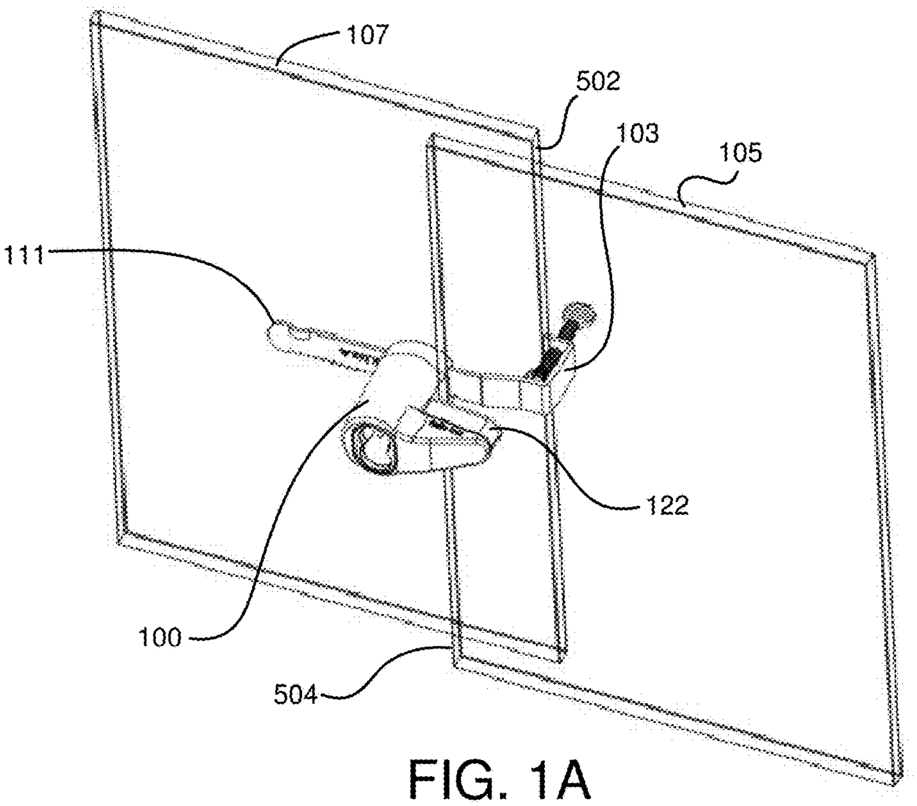
FIG. 1A illustrates a locking assembly mounted on sliding glass doors in accordance with an embodiment of the present disclosure.
Figure 1B:
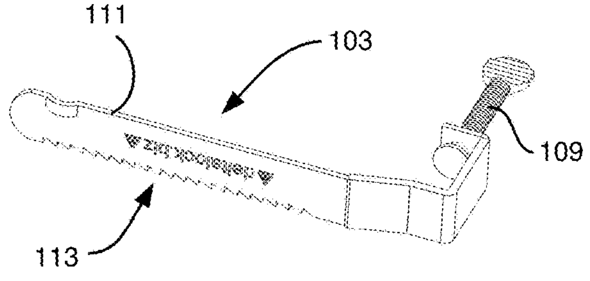
FIG. 1B is a locking bar in accordance with an embodiment of the present disclosure.

Referring to FIG. 1A, a ratchet lock assembly including locking device 100 and locking bar 103 is illustrated mounted on sliding glass doors in accordance with an embodiment of the present disclosure. The locking device 100 is employed with the locking bar 103 to prevent opening of, for example, sliding glass doors 105, 107. In use, locking bar 103 is disposed on an edge 502 of sliding glass door 107 via securing means 109, as is more clearly shown in FIG. 1B. The locking device 100 is then disposed over end 111 of locking bar 103 until the locking device 100 comes into contact with an edge 504 of sliding glass door 105. As will be described in more detail below, the locking device 100 engages the serrated edge 113 of the locking bar 103 to secure the locking device 100 to the locking bar 103 thus preventing movement of the sliding glass doors 105, 107.

Figure 1C:
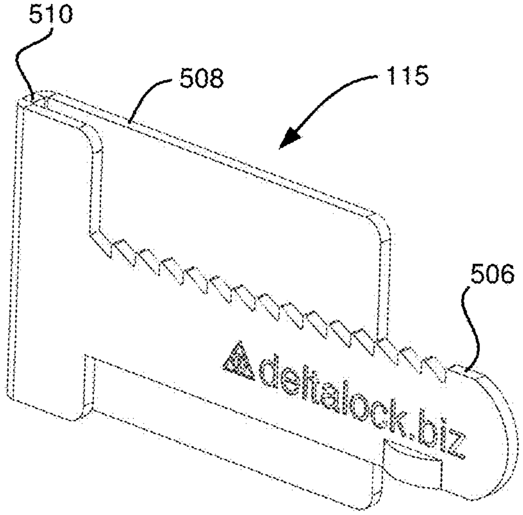
FIG. 1C is a locking bar in accordance with another embodiment of the present disclosure.

It is to be appreciated that the locking bar may come in other shapes and sizes to accomplish the securing of the doors 105, 107. For example, locking bar 115 is illustrated in FIG. 1C. Locking bar 115 includes a first member 506 with serrated edge coupled in parallel with a second member 508 via member 510. Member 508 is wider than the first member 506. It is to be appreciated that locking bar 115 interacts with locking device 100 in a manner similar to that described in relation to locking bar 103. In use, locking bar 115 is disposed on sliding door 107 so member 510 comes into contact with edge 502. Members 506 and 508 will then be disposed on opposite sides of door 107. Locking device 100 may then be placed on member 506 to lock the sliding doors in place as described above.

Figure 2A:
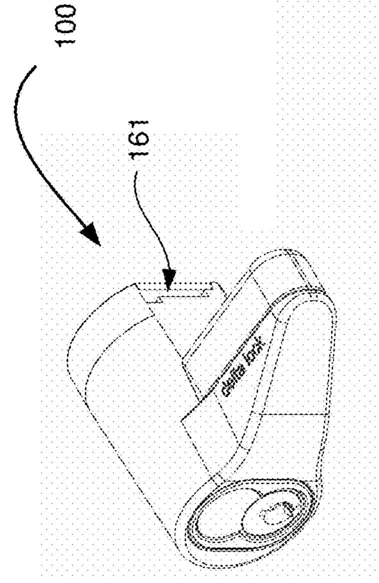
FIG. 2A is a perspective view of a locking device in according with an embodiment of the present disclosure.
Figure 2B:
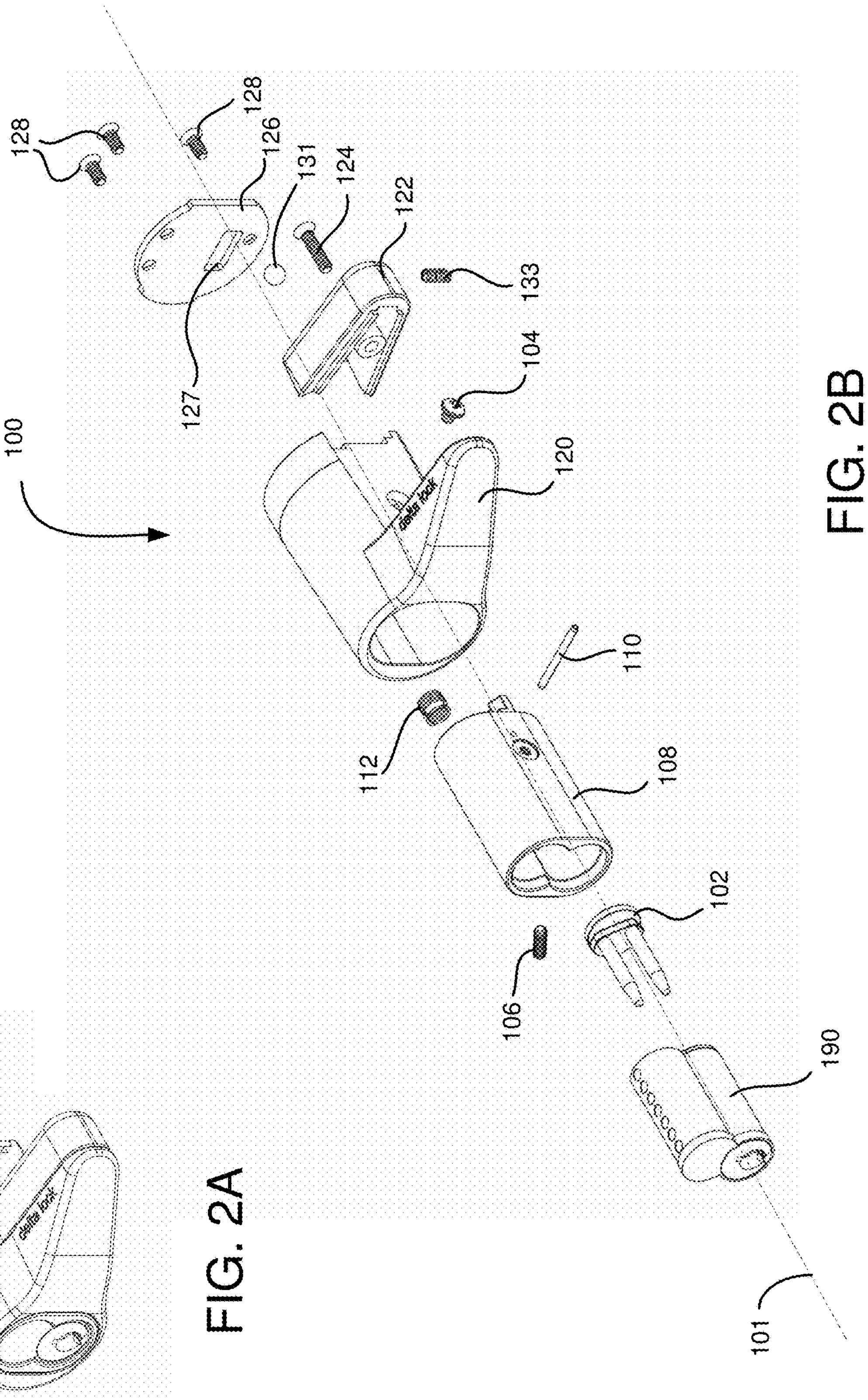
FIG. 2B is an exploded view of the locking device shown in FIG. 2A.

FIG. 2A is a perspective view of a plunger-type locking device 100 in according with an embodiment of the present disclosure Referring to FIG. 2B, an exploded perspective view of locking device 100 is shown in accordance with the present disclosure. Locking device 100 includes a prong driver 102, screw 104, a plunger barrel 108, a roll pin 110, an elastic member 112, e.g., spring, housing 120, bumper 122, and end plate 126. As will be described in more detail below, a ratchet bar 103 may be disposed in housing 120 of locking device 100 where the bar is locked in place by a projection of the plunger barrel 108 mates with the bar 103 (or passes through an aperture of the bar) when the plunger barrel 108 is urged toward the bar 103. When the projection of the plunger barrel 108 mates or passes through the bar 103, the projection prevents the bar 103 from being removed from the housing 120 providing positive locking, where the plunger barrel 108 and projection can only be retracted through the use of an appropriate key actuating the locking actuation member.

It is to be appreciated that a locking actuation member 190, e.g., a small format interchangeable core (SFIC) 190, may be disposed in the barrel 108 to mate with the driver 102, where SFIC, driver 102, barrel 108 and housing 120 are each aligned along longitudinal axis 101. Although the embodiments described herein employ a SFIC 190, it is further to be appreciated that other types of locking actuation members are contemplated to be within the scope of the present disclosure, e.g., a key removable core (KRC), a cylinder, etc.

Figure 3A:
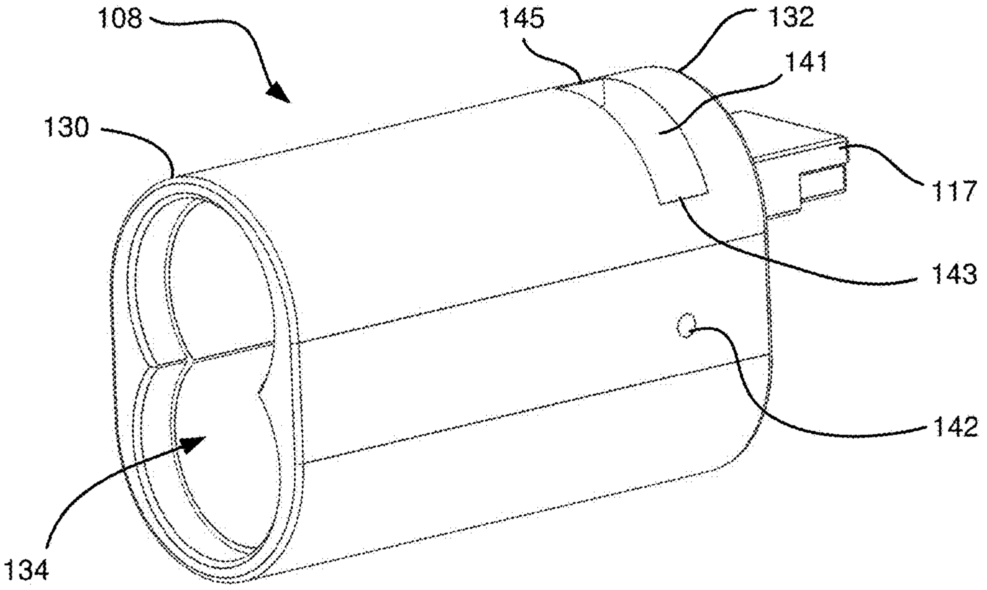
FIG. 3A is a front, perspective view of a plunger barrel in accordance with an embodiment of the present disclosure.
Figure 3B:
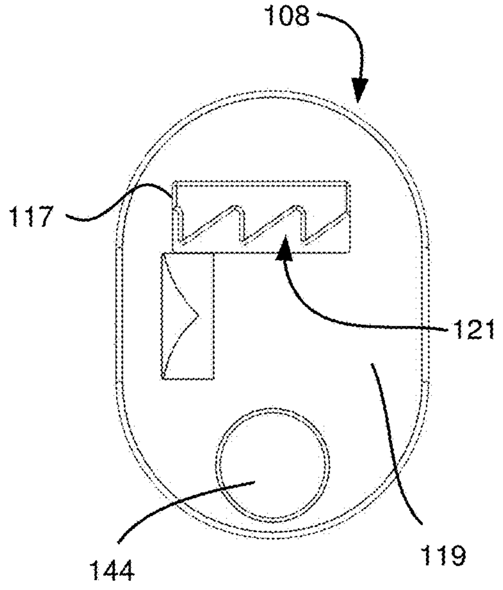
FIG. 3B is a rear view of the plunger barrel shown in FIG. 3A.
Figure 3C:
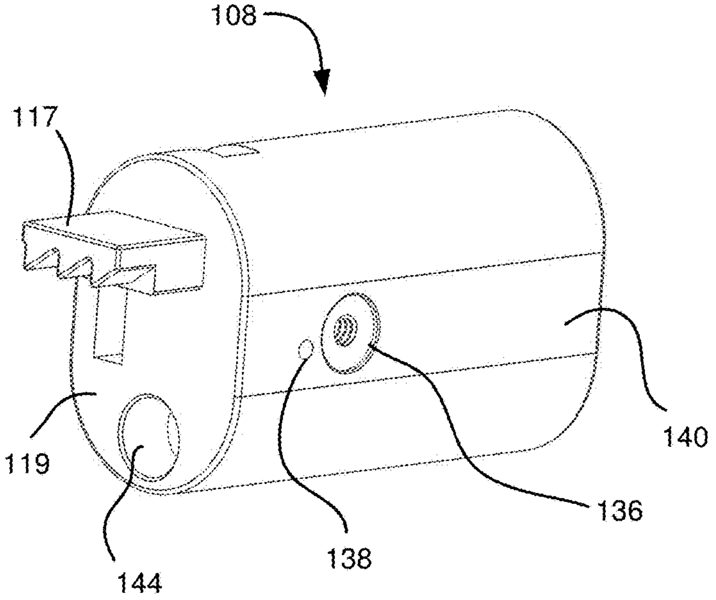
FIG. 3C is a rear perspective view of the plunger barrel shown in FIG. 3A.

Referring to FIGS. 3A, 3B and 3C, various views of plunger barrel 108 are shown in accordance with the present disclosure. Barrel 108 includes ends 130 and 132, where a locking actuation member, e.g., SFIC, is disposed through end 130 into interior 134 of barrel 108. Barrel 108 also includes apertures 136 and 138 disposed through an outer wall 140 of barrel 108. Aperture 136 is configured to receive travel stop screw 104. Aperture 138 is configured to receive a first end of the driver retention roll pin 110. Barrel 108 also includes aperture 142, where aperture 142 is configured to receive a second end of pin 110. In this way, pin 100 is disposed in, and secured to, the interior of barrel 108 perpendicularly to longitudinal axis 101. As shown in FIG. 3A, barrel 108 includes slot 141, where slot 141 includes ends 143 and 145.

Plunger barrel 108 also includes a bolt member or projection 117. Bolt member or projection 117 extends perpendicularly from a rear wall 119 of the barrel 108. Rear wall 119 further includes cylindrical recess 144 for receiving elastic member or spring 112. As will be described in more detail below, spring 112 biases barrel 108 away from a rear end 150 of housing 120. It is to be appreciated that spring 112 may be any elastic member, body or device that recovers its original shape when released after being distorted. Bolt member or projection 117 includes a plurality of ridges 121 (or teeth) that are configured to mate with corresponding teeth 113 of a locking bar 103, 115, e.g., a ratchet strike, as will be described below.

Figure 4A:
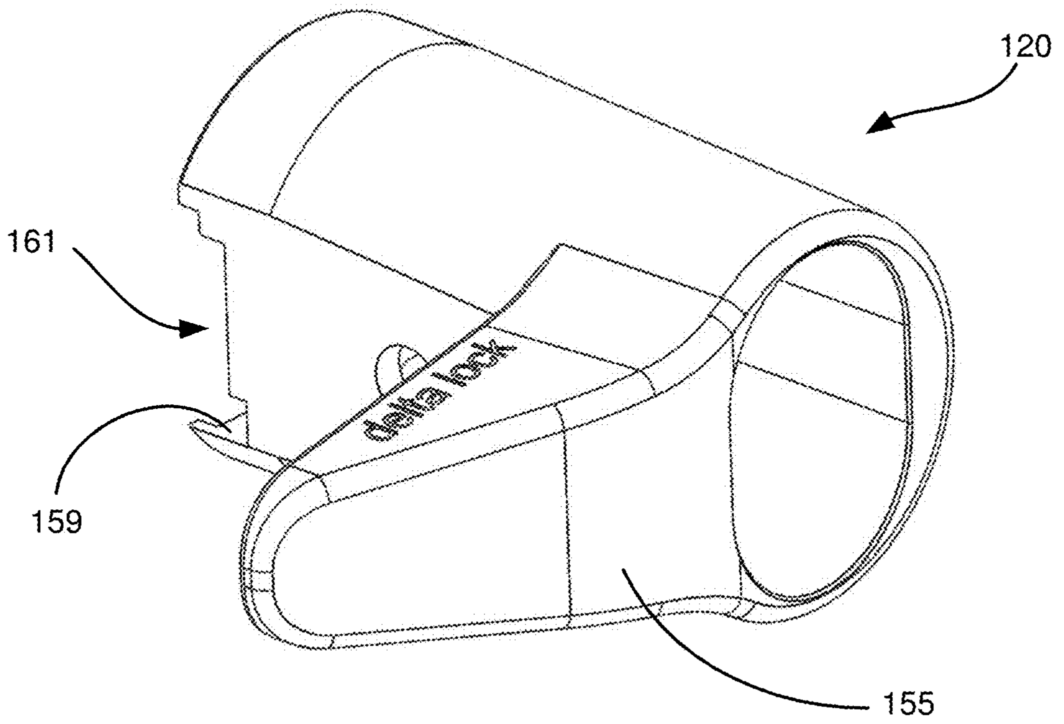
FIG. 4A is a left perspective view of a housing in accordance with an embodiment of the present disclosure.
Figure 4B:
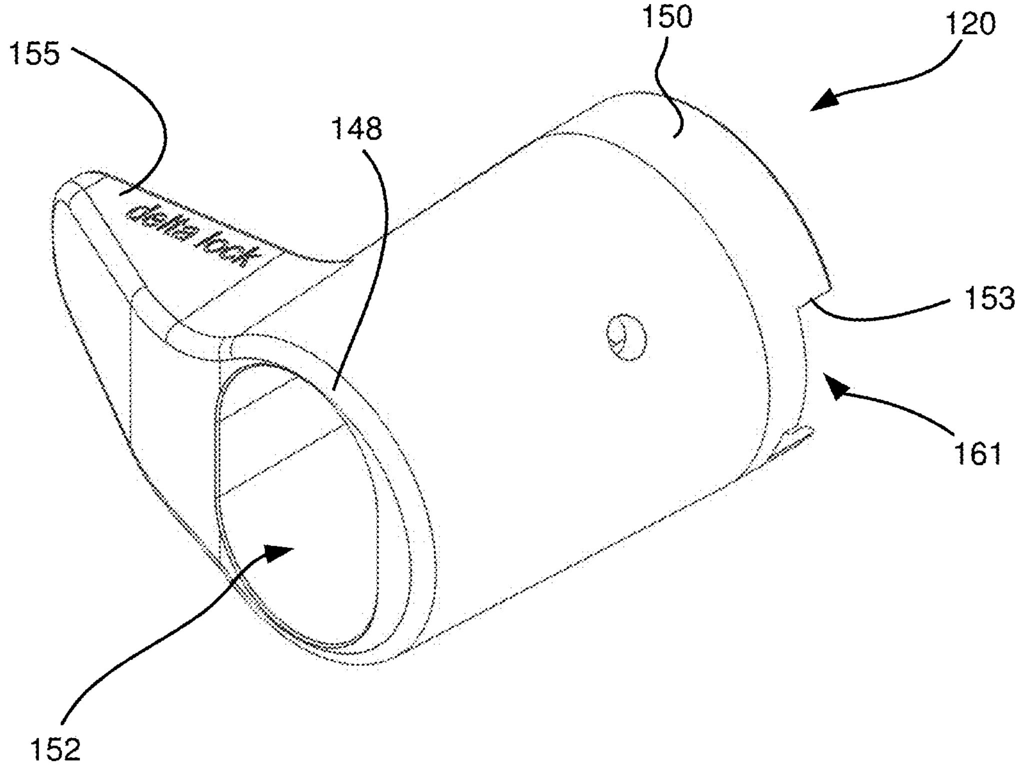
FIG. 4B is a right perspective view of the housing shown in FIG. 4A.
Figure 4C:
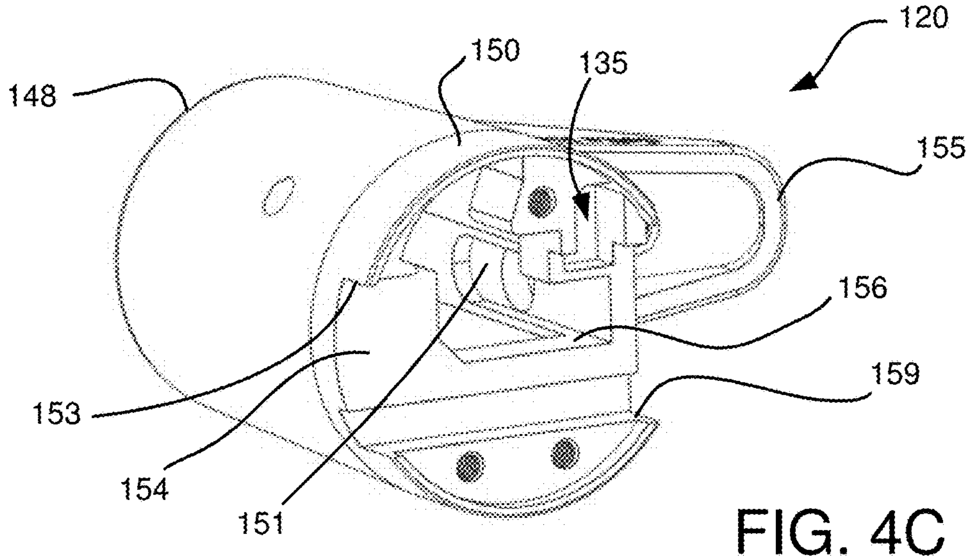
FIG. 4C is a rear perspective view of the housing shown in FIG. 4A.
Figure 4D:
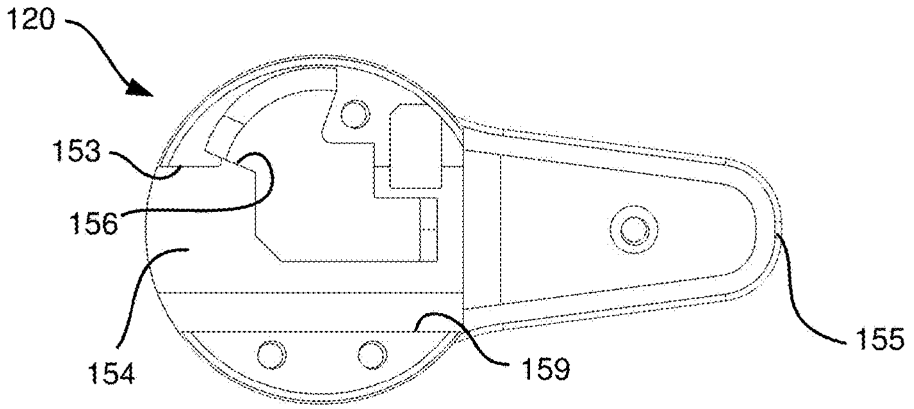
FIG. 4D is a rear view of the housing shown in FIG. 4A.
Figure 4E:
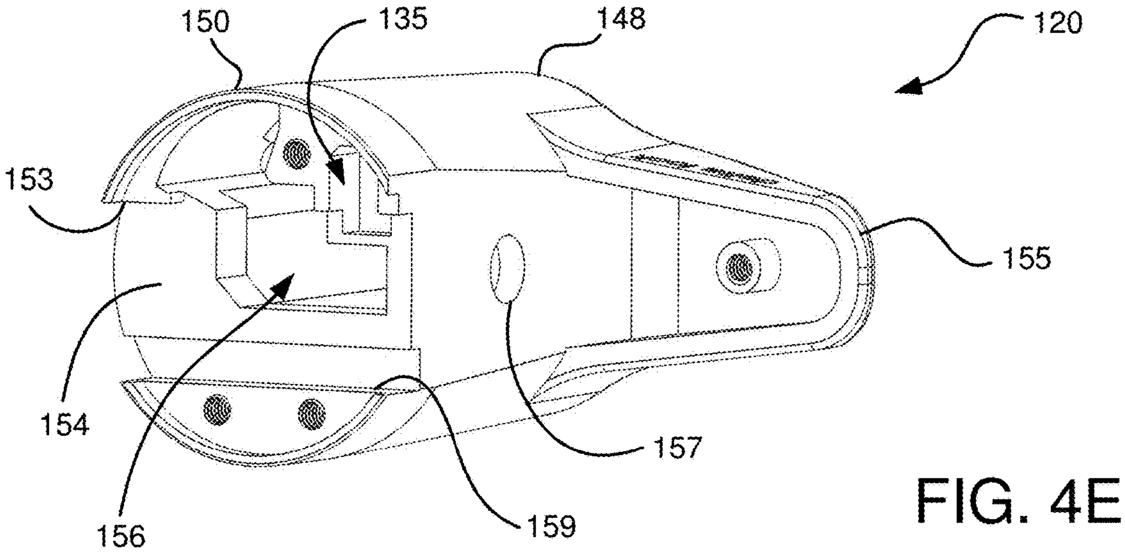
FIG. 4E is another rear perspective view of the housing shown in FIG. 4A.

Referring to FIGS. 4A through 4H, various views of housing 120 are shown in accordance with the present disclosure. Housing 120 includes a first end 148 and a second end 150, wherein first end 148 includes an aperture 152 for receiving barrel 108. Plunger barrel 108 is slidably disposed through end 148 into the hollow interior 152 of housing 102, where barrel 108 and housing 120 are each aligned along longitudinal axis 101. Barrel 108 is biased away from the second end 150 of the housing 120 by elastic member 112, e.g., a coil spring, in a direction B (along longitudinal axis 101) as indicated in FIG. 7C. As shown in FIG. 4D, end 150 includes a surface or wall 154. Surface 154 includes aperture 156, where aperture 156 is configured to receive at least a portion of projection or rectangular member 117 when barrel 108 is slidably advanced along longitudinal axis 101 toward plate 126, such that, locking device 100 achieves a locked position. The second end 150 of housing 120 further includes recesses 153, 159 in the outer wall. A plate 126 is disposed on end 150 of housing 120 thereby creating a passageway 161 with the recesses 153, 159 to receive the locking bar 113, 115. Plate 126 includes an aperture 127 that is configured to receive at least a portion of projection or rectangular member 117 when plunger barrel 108 is slidably advanced along longitudinal axis 101 toward plate 126, such that, locking device 100 achieves a locked position. It is to be appreciated that when in the locked position, the projection 117 will pass through aperture 156 of the housing 120, either mate or pass through an aperture of the locking bar and pass through the aperture 127 of plate 126 to positively lock the locking bar in place.

Housing 120 also includes a slot 151 disposed on an internal surface of the aperture 152, as best shown in FIG. 4C. When barrel 108 is disposed in housing 120, a portion of travel stop 104 is disposed through aperture 157 of the housing 120 and is coupled to aperture 136 of barrel 108. The travel stop 104 is then enabled to ride in slot 151. It is to be appreciated that when a proper or operating key (i.e., a key other than the control key used to actuate and engaging element of SFIC) is inserted into a key hole of the SFIC and rotated, barrel 108 is slidable along longitudinal axis 101 within housing 120 to lock and unlock device 100, as will be described in greater detail below. Slot 151 controls and limits the longitudinal fore and aft motion of barrel 108 and travel stop 104 relative to housing 120.

Figure 7A:
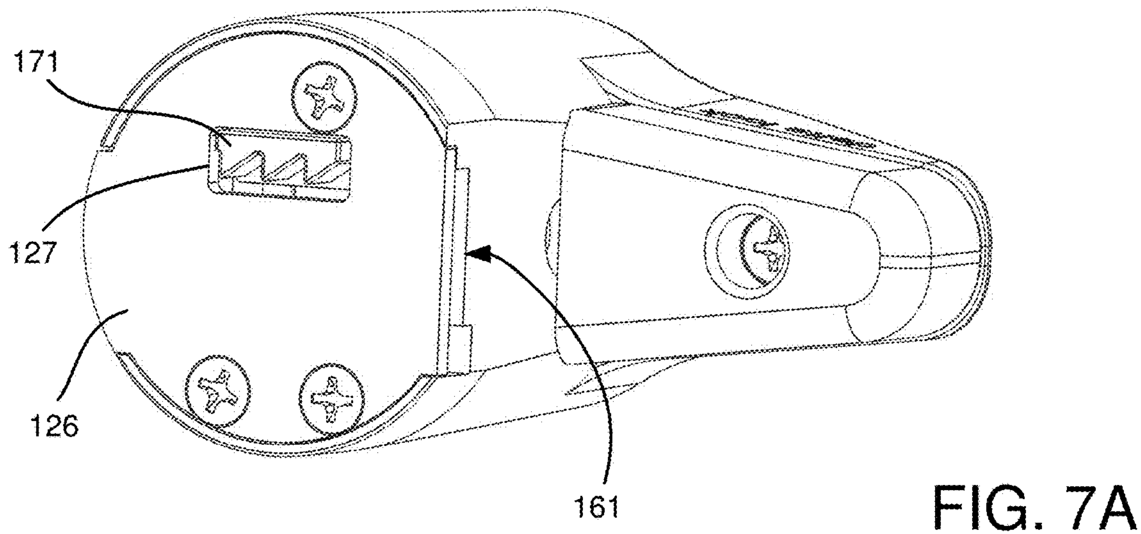
FIG. 7A is a rear perspective view of the locking device in accordance with an embodiment of the present disclosure.
Figure 7B:
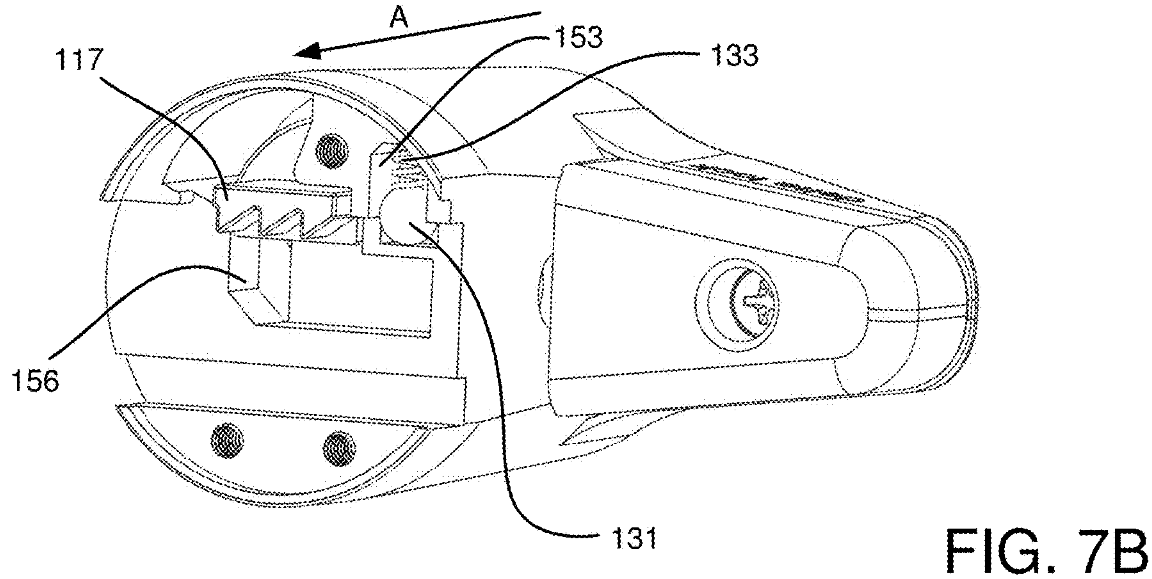
FIG. 7B is a rear view of the locking device of FIG. 7A with an end plate removed showing the plunger barrel in a locked position.
Figure 7C:
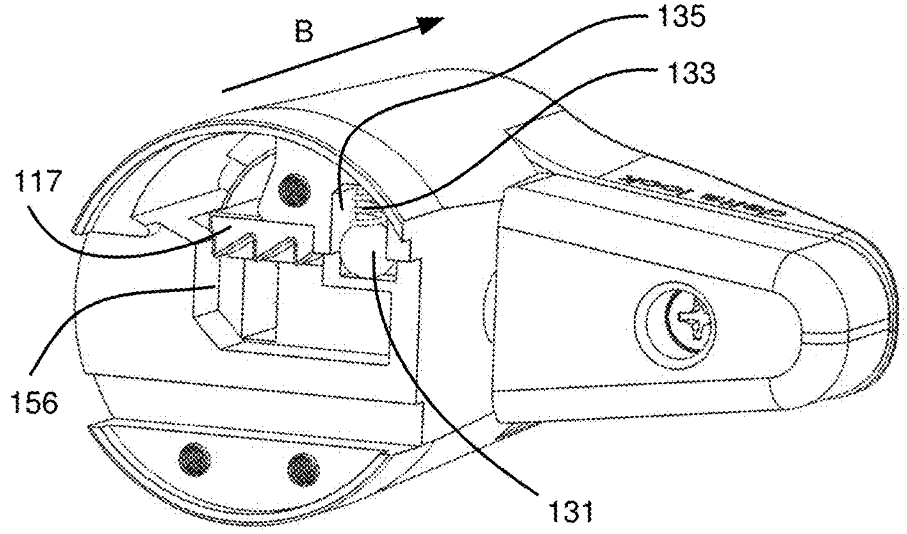
FIG. 7C is a rear view of the locking device of FIG. 7A with the plunger barrel in an open position.
Figure 7D:
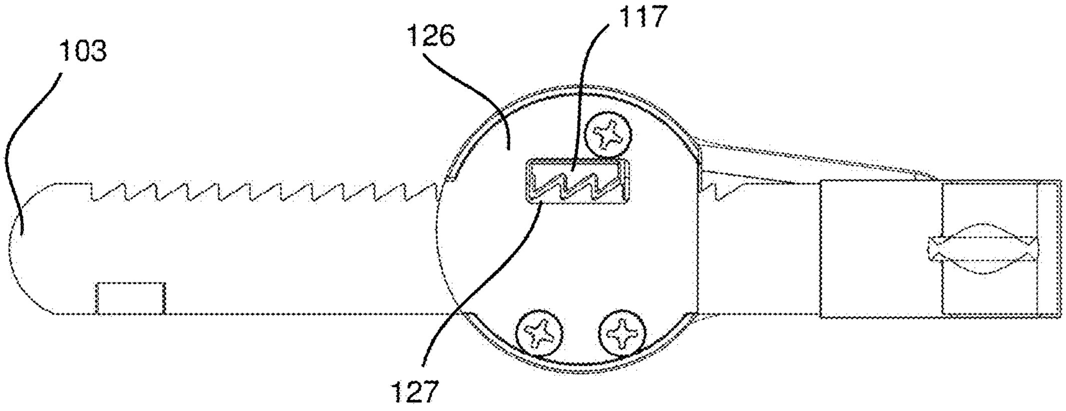
FIG. 7D is a rear view of the locking device of FIG. 7A in the locked position with a locking bar.
Figure 7E:
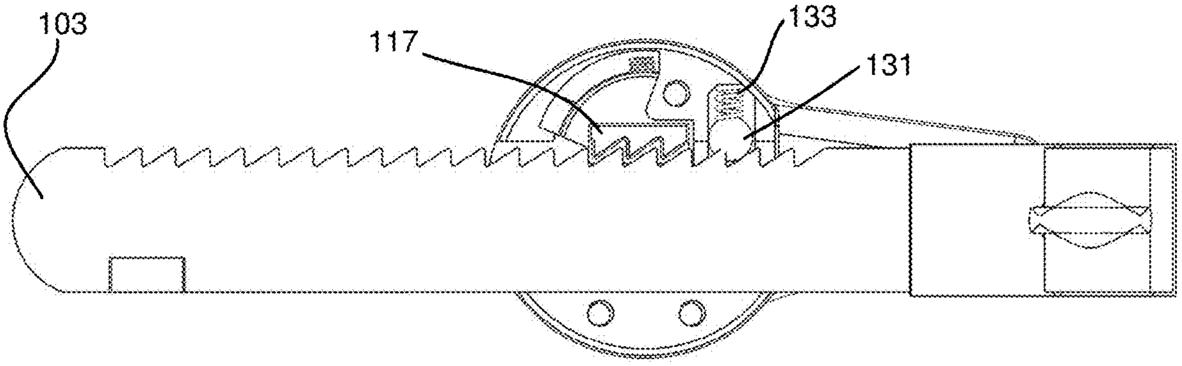
FIG. 7E is a rear view of the locking device shown in FIG. 7D with an end plate removed.

When the locking device 100 is locked (as shown in FIG. 7A), travel stop 104 will be at in slot 151 closest to end 150 of the housing and projection bolt member 117 will extend passed surface 154 (i.e., passed through aperture 156) of housing 120 and into aperture 127 of plate 126 in a direction A (as shown in FIG. 7B) along longitudinal axis 101. It is to be appreciated that in the locked position, bolt member 117 is configured to interact with a locking bar or ratchet strike to secure an object, such as a sliding door, in a locked or closed position. When locking device 100 is unlocked (as shown in FIG. 7C), elastic member or spring 112 is configured to bias plunger barrel 108 in a direction B along longitudinal axis 101 away from housing 120 and travel stop 104 will be at the other end of slot 151 toward end 148 of housing 120, where bolt member 117 is retracted into aperture 156 to enable the locking bar or ratchet strike to be removed.

Figure 4F:
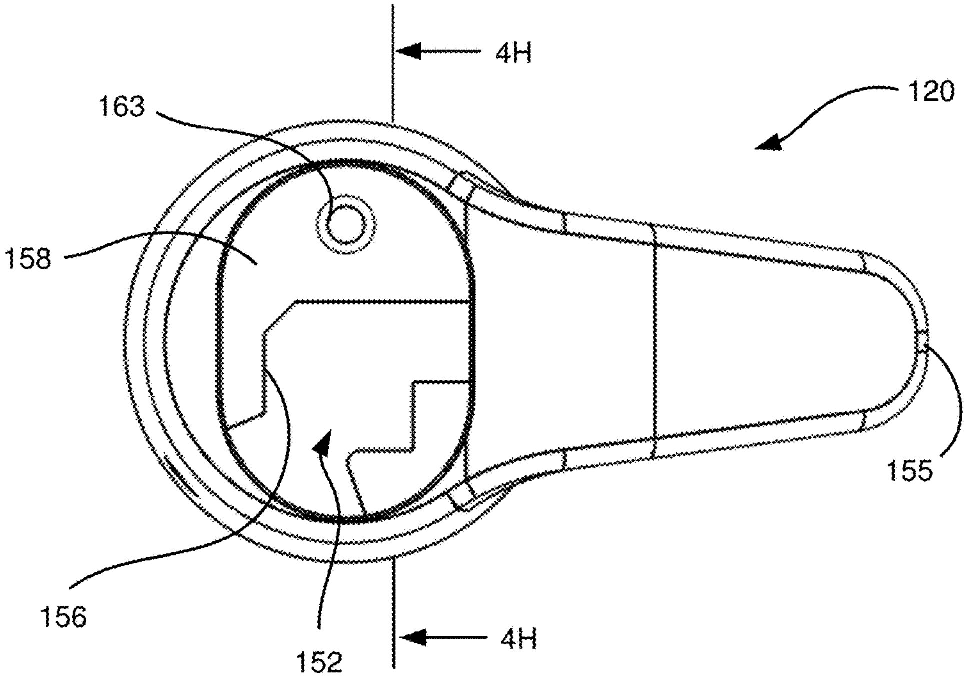
FIG. 4F is a front view of the housing shown in FIG. 4A.
Figure 4G:
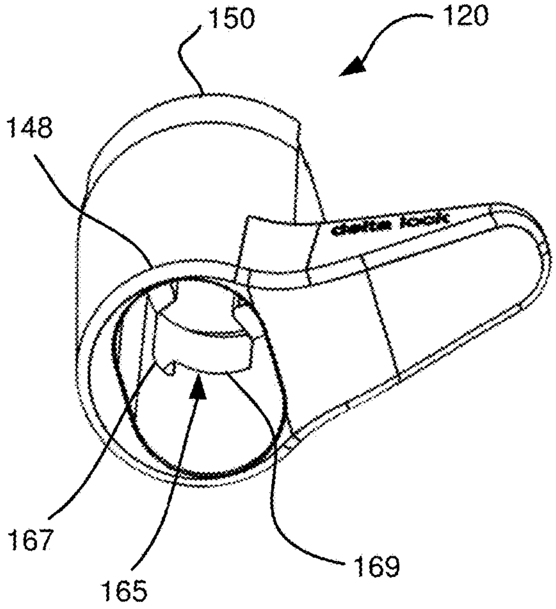
FIG. 4G is a front perspective view of the housing shown in FIG. 4F.
Figure 4H:
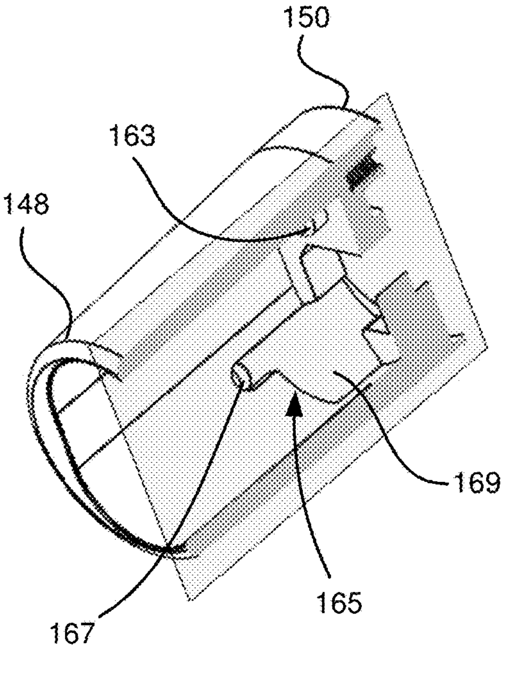
FIG. 4H is cross section view of the housing shown in FIG. 4F taken along line 4H-4H.

FIG. 4F illustrates a front view of the housing 120 looking through aperture 152. At the rear end 150 of housing 120, an opposite, interior surface 158 of solid feature or wall 154 includes a cylindrical member 163 configured for receiving an open end of spring 112. Referring to FIGS. 4G and 4H, an interior surface of housing 120 includes a recess 165 including a first portion 167 and a second portion 169. The recess 165 is configured to enable movement of a retaining element 106 coupled to driver 102 to control the fore and aft movement of the barrel 108, as will be described below.

Surface 154 of housing 120 further includes a recess 135. The recess 135 is configured to retain ball 131 and spring 133. The ball 131 and spring 133 act as a resilient detent to help proper alignment of the ratchet bar 103. The ball 131 moves on the teeth 113 of the bar 103 and the spacing between the teeth each time the ball 131 goes from tooth to tooth allowing the plunger 117 to align up so the user does not need to find the proper lock in/locking point. It is to be appreciated that other mechanisms may be employed as the detent to properly align the ratchet bar 103.

Figure 5A:
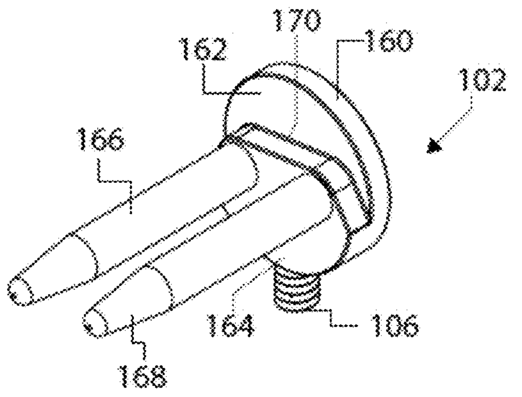
FIG. 5A is a perspective view of a prong driver in accordance with an embodiment of the present disclosure.
Figure 5B:
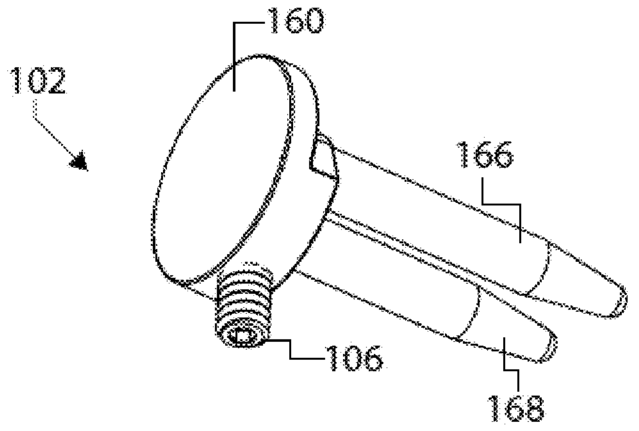
FIG. 5B is another perspective view of the prong driver shown in FIG. 5A.
Figure 5C:
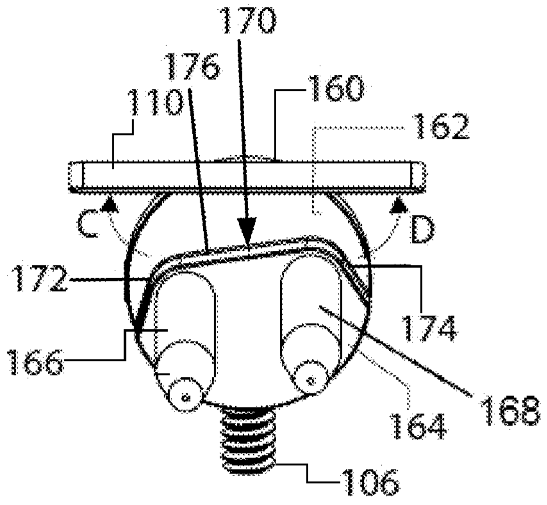
FIG. 5C is a front view of the prong driver shown in FIG. 5A.

Referring to FIGS. 5A, B, and C, various views of driver 102 are shown in accordance with the present disclosure. As shown in FIGS. 5A-5C, plate or disc 160 is coupled to engaging element 106. Engaging element 106 extends out from plate 160 in a direction perpendicular to longitudinal axis 101. As will be described below, slot 141 of barrel 108 is configured to receive engaging element 106 enabling the engaging element 106 to ride in recess 165 of housing 120. Also, plate 160 includes surfaces 162 and 164, where prongs 166 and 168 are coupled to, and extend from, surface 164 parallel to longitudinal axis 101. Surface 164 protrudes away from surface 162, such that, a ledge 170 is formed. Ledge 170 includes portions 172, 174, and 176, where portions 172 and 174 are each adjacent to portion 176 of ledge 170 (i.e., portion 176 is disposed between portions 172 and 174). In one embodiment, each of portions 172 and 174 of ledge 170 form an acute angle relative to portion 176 of ledge 170.

Figure 5D:
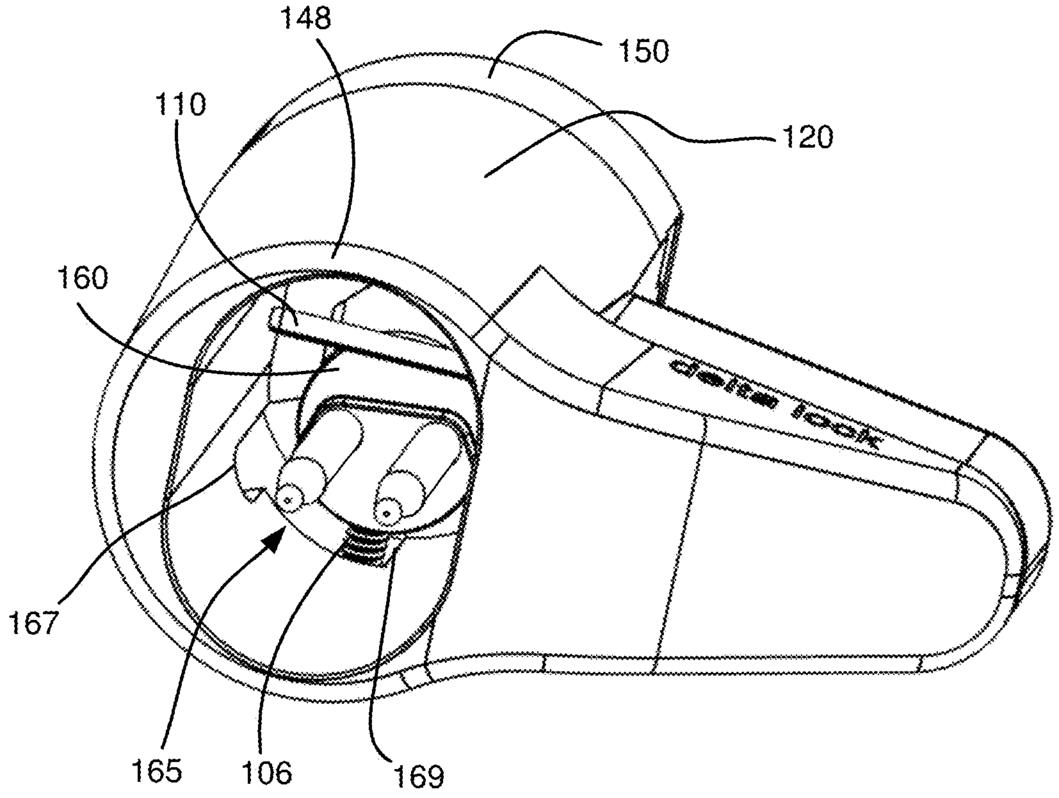
FIG. 5D is a perspective view illustrating an interaction of the prong driver and housing in a first position in accordance with an embodiment of the present disclosure.
Figure 5E:
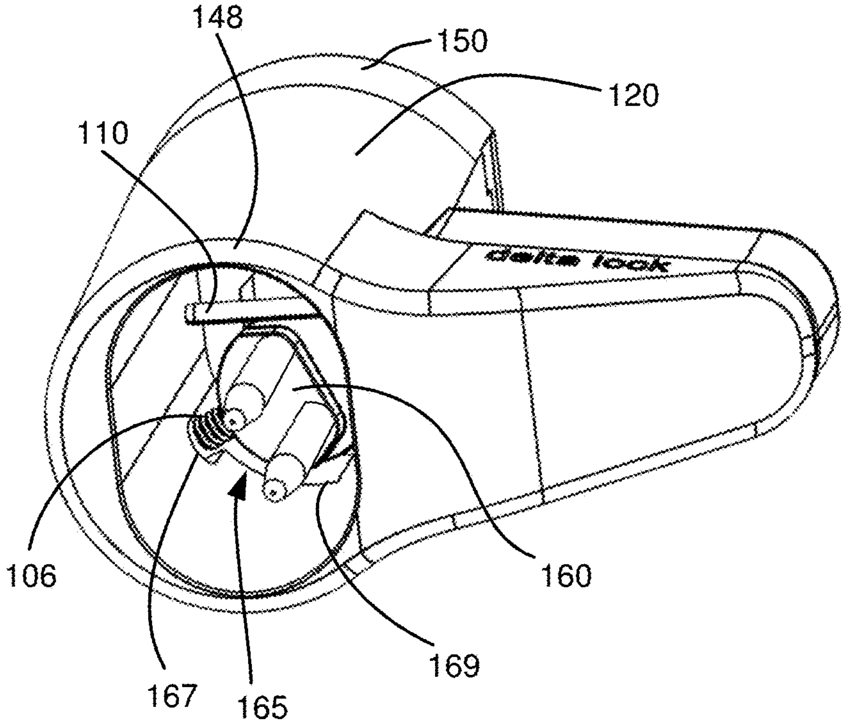
FIG. 5E is a perspective view illustrating an interaction of the prong driver and housing in a second position in accordance with an embodiment of the present disclosure.
Figure 6A:
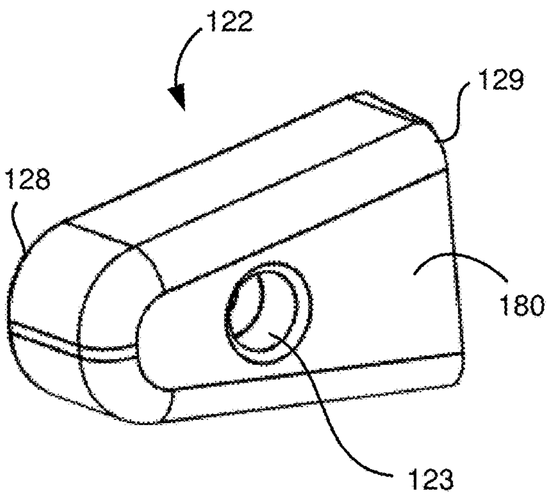
FIG. 6A is a perspective view of a bumper in accordance with an embodiment of the present disclosure.
Figure 6B:
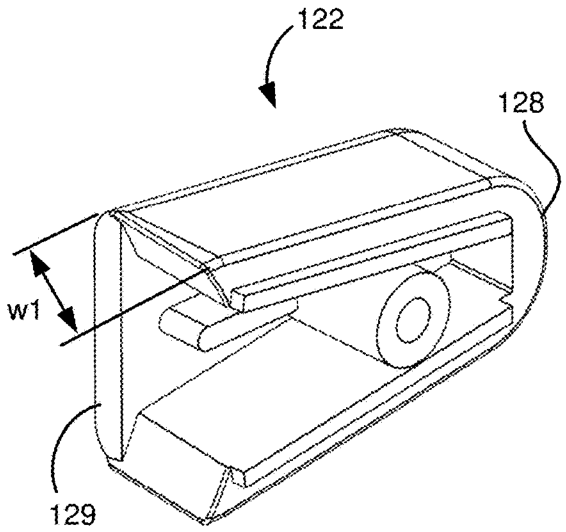
FIG. 6B is a rear perspective view of the bumper shown in FIG. 6A.
Figure 6C:
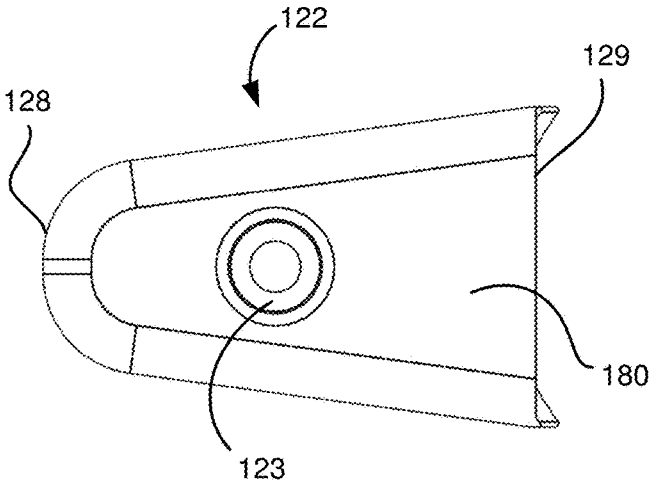
FIG. 6C is a front view of the bumper shown in FIG. 6A.
Figure 6D:
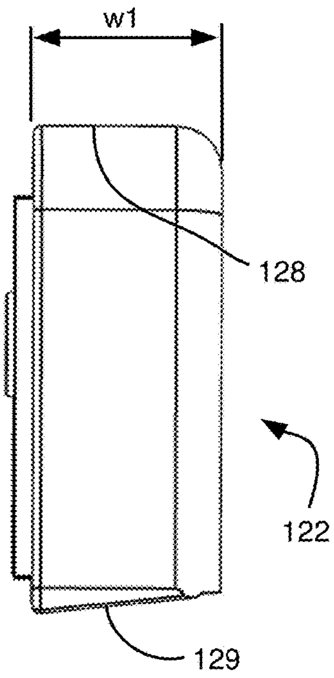
FIG. 6D is a side view of the bumper shown in FIG. 6A.

When a proper key is inserted into key hole of a locking actuation member 190, e.g., a SFIC, and rotated, e.g., in a clockwise direction about axis 101, thereby rotating driver 102 (as indicated by arrow C in FIG. 5C), portion 172 of ledge 170 is configured to come into contact with pin 110, such that, driver 102 cannot be rotated in clockwise direction C any further. In the locked position of locking device 100, the engaging element 106 is disposed in portion 169 of recess 165, as shown in FIG. 5D. When the driver 102 is rotated in the clockwise direction C, engaging element 106 will move from portion 169 of recess 165 toward portion 167 of recess 165. When the engaging element 106 is aligned with portion 167 of recess 165 as shown in FIG. 5E, spring 112 will urge barrel 180 toward the front end 148 of housing 120 causing the engaging element 106 to ride in portion 167 of recess 165. In this position of barrel 108, the projection 117 is withdrawn into housing 120, is not engaging the locking bar and the locking device 100 is in an open position.

When a proper key is inserted into key hole of locking actuation member 190, e.g., a SFIC, and rotated counterclockwise, thereby rotating driver 102 (as indicated by arrow D in FIG. 5C), portion 174 of ledge 170 is configured to come into contact with pin 110, such that, driver 102 cannot be rotated anymore in counterclockwise direction D. It is to be appreciated that when driver 102 is rotated either clockwise or counterclockwise, portion 176 of ledge 170 does not come into contact with pin 110. In this way, portions 172, 174 of driver 102 and pin 110 work together to limit the rotational range of driver 102 about longitudinal axis 101.

To lock locking device 100, the barrel 108 is urged toward the second end 150 of housing 120 causing the engaging element 106 to also move toward the second end 150 of housing 120 out of portion 167 of recess 165. In this position of barrel 108, the spring 112 is compressed and the projection 117 is passing through aperture 156 of housing 120 to mate with the locking bar 103. When the driver 102 is rotated in the counterclockwise direction D, engaging element 106 will move from portion 167 of recess 165 toward portion 169 of recess 165. When the engaging element 106 is retained within portion 169 of recess 165 as shown in FIG. 5D, the barrel 180 will remain toward the second end 150 of housing 120. In this position of driver 102, the barrel 108 is seated within the housing 120, projection 117 is engaging the locking bar 103 and the locking device 100 is in a locked position.

Referring to FIGS. 6A through 6D, a bumper 122 in accordance with an embodiment of the present disclosure is illustrated. Bumper 122 has a first end 128, second end 129 and is configured to be coupled to member 155 which extends perpendicularly to the longitudinal axis of housing 120 and the bumper 122 being secured with screw 124 when disposed in aperture 123. It is to be appreciated that member 155 and bumper 122 stabilize locking device 100 when mounted, for example, to a sliding glass door of a display cabinet. For example, referring to FIG. 1A, bumper 122 is in contact with sliding door 105. The bumper 122 has a predetermined width w1 to accommodate a spacing between a surface 180 of the bumper 122 and the glass door 105. The bumper 122 may be configured in a variety of widths. In one embodiment, the locking device 100 may be supplied with several bumpers 122 of differing widths and an appropriate bumper 122 may be selected upon installation. It is contemplated to be within the scope of the present disclosure that the bumper 112 is removable and replaceable.

Figure 8A:
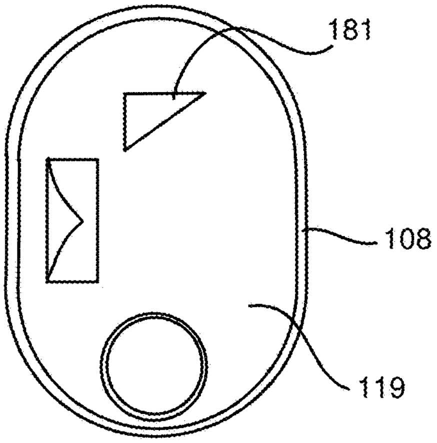
FIG. 8A is a rear view of a plunger barrel in accordance with another embodiment of the present disclosure.
Figure 8B:
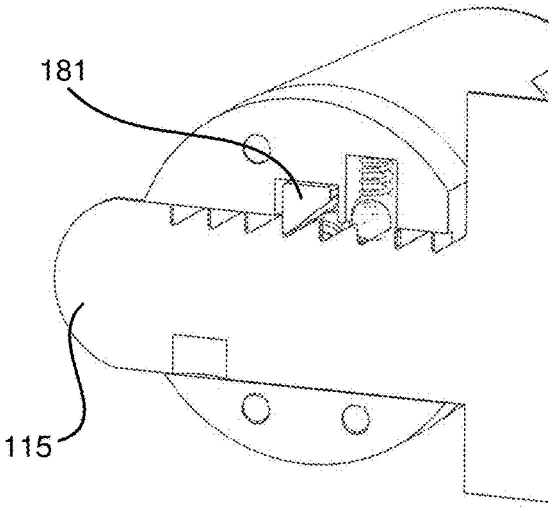
FIG. 8B is a rear view of the locking device with an end plate removed illustrating the plunger barrel shown in FIG. 8A.
Figure 8C:
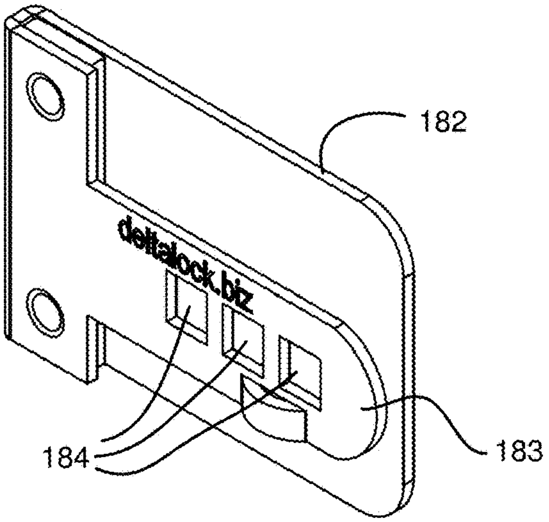
FIGS. 8C and 8D illustrate a locking bar in accordance with a further embodiment of the present disclosure.
Figure 8D:
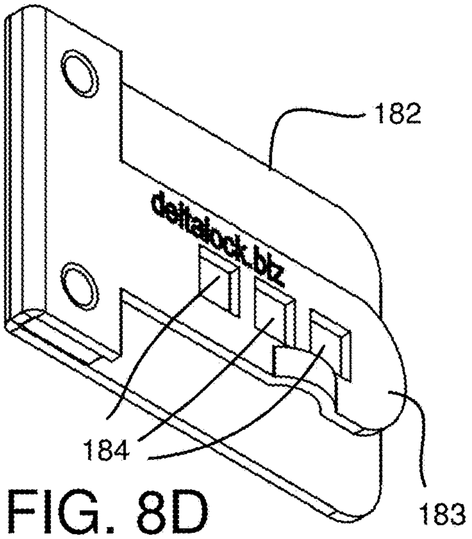
Figure 8E:
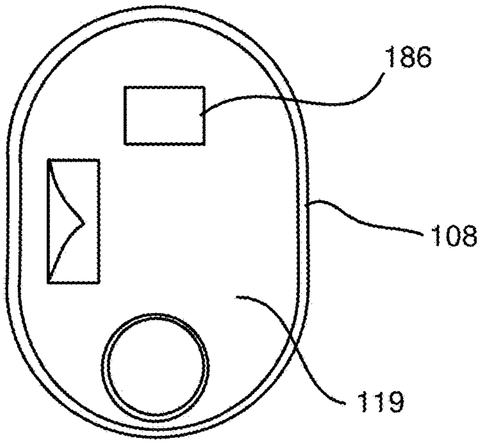
FIG. 8E is a rear view of a plunger barrel in accordance with yet another embodiment of the present disclosure.
Figure 8F:
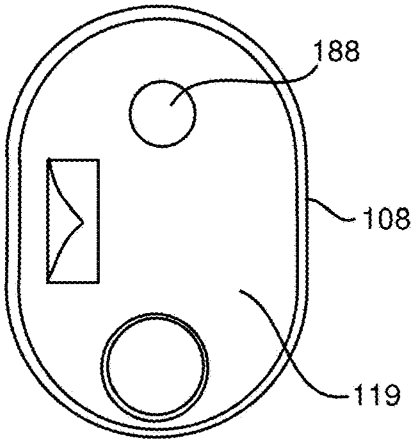
FIG. 8F is a rear view of a plunger barrel in accordance with a further embodiment of the present disclosure.

It is to be appreciated that the projection 117 of barrel may be configured in other shapes and still remain to be within the scope of the present disclosure, i.e., the ratchet bar is engaged by the locking device through the projection (or plunger) that blocks the bar from being removed. For example, referring to FIG. 8A, barrel 108 is illustrated with a triangular projection 181. As shown in FIG. 8B, the triangular projection 181 mates with the teeth of bar 115 when the locking device 100 is disposed on the bar. Furthermore, the locking device 100 of the present disclosure may be employed with other types of locking bars. For example, locking bar 182 is shown in FIG. 8C. Locking bar 182 includes a bar portion 183 with at least one aperture 184 that is configured to receive projection 181. In use, the triangular projection 181 will be disposed in the at least one aperture 184 locking the locking device 100 in place, i.e., positive locking. As described above, the projection of barrel 108 may take many forms as long as the projection is sized to enter the at least one aperture 184, i.e., the aperture is of a predetermined shape and the barrel has a complementary shaped projection. For example, as shown in FIG. 8E, projection 186 may be generally square and the aperture will be square. As shown in FIG. 8F, projection 188 may be generally circular or cylindrical and the aperture will be circular. The plunger barrel and associated projection may be only removed from the bar (i.e., unlocked) through the use of a key in the locking actuation member, wherein upon activation with the proper key, the plunger barrel is urged away from the bar via the spring or other elastic member or device so the projection is disengaged from the bar.

Figure 8G:
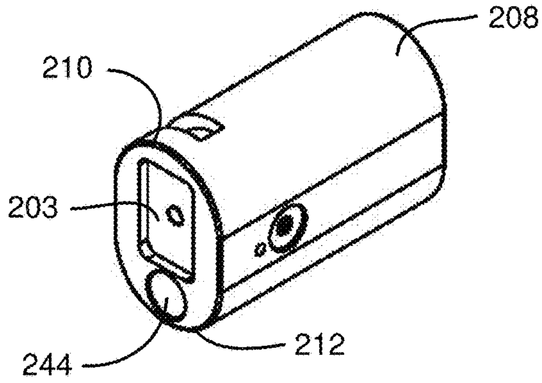
FIGS. 8G and 8H are perspective views of a barrel in accordance with another embodiment of the present disclosure.
Figure 8H:
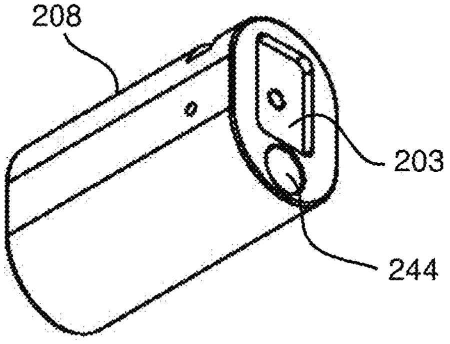
Figure 8I:
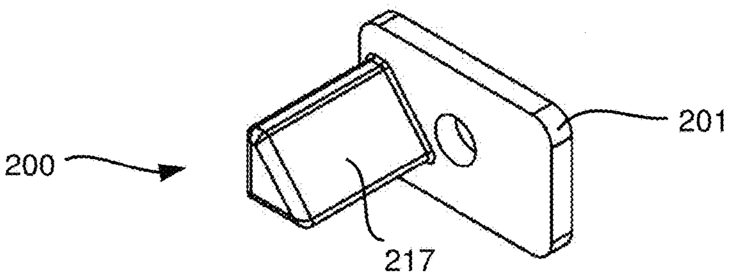
FIGS. 8I and 8J are perspective views of an adjustable projection in accordance with another embodiment of the present disclosure.
Figure 8J:
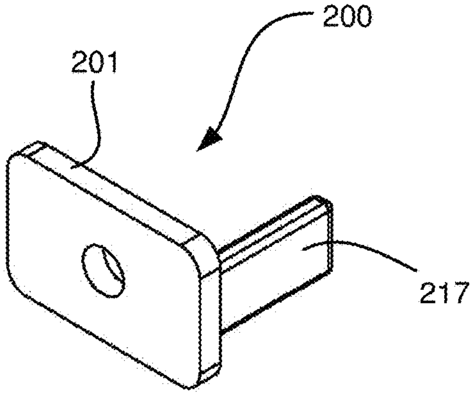
Figure 8K:
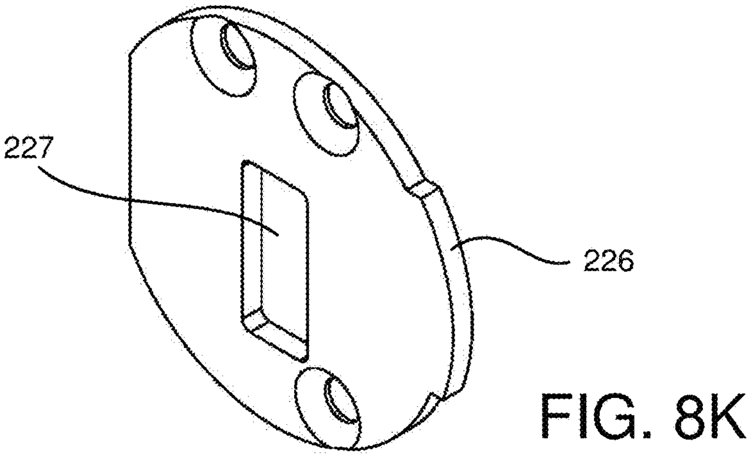
FIG. 8K illustrates an end plate configured to be employed with the adjustable projection shown in FIGS. 8I and 8J.

In another embodiment, the projection of barrel 108 is repositionable to adapt to various environments. Referring to FIG. 8G, barrel 208 includes recess 203 configured to receive projection 200, as shown in FIGS. 8I and 8J. Projection 200 includes a rectangular member 201 and a projection portion 217. The rectangular member 201 is configured to fit in recess 203. Depending on the application of locking device 100, the projection 200 may be coupled to the barrel 208 so projection portion 217 is disposed toward a top end 210 of barrel 208, or alternatively, the projection portion is disposed toward a lower portion 212 of barrel 208 near recess 244. Additionally, end plate 226 is configured with slot 227 that enables the projection portion 217 to be configured in either of the two ways described above.

Figure 9B:
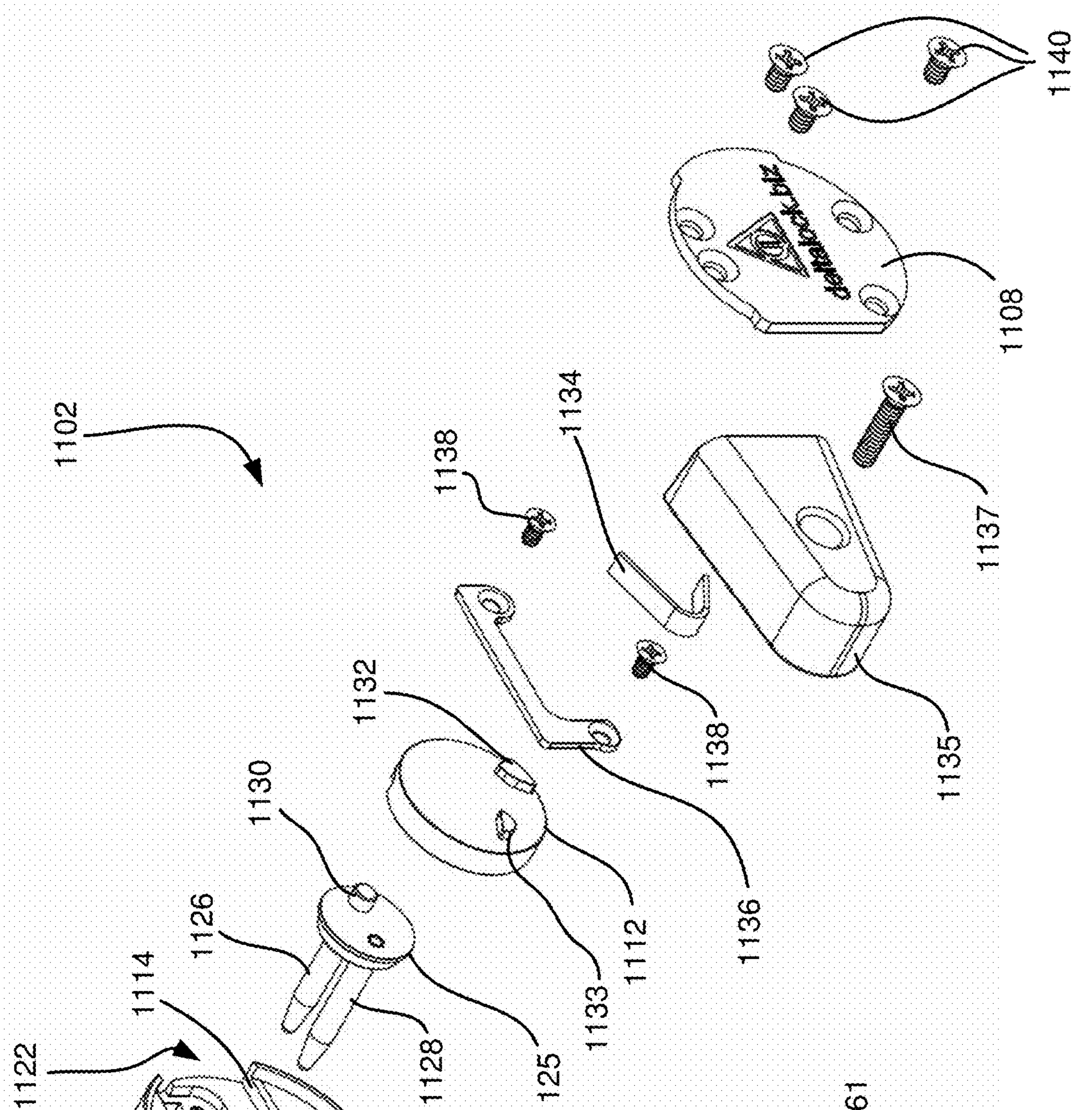
FIG. 9B is an exploded view of the ratchet type locking device shown in FIG. 9A.
Figure 9A:
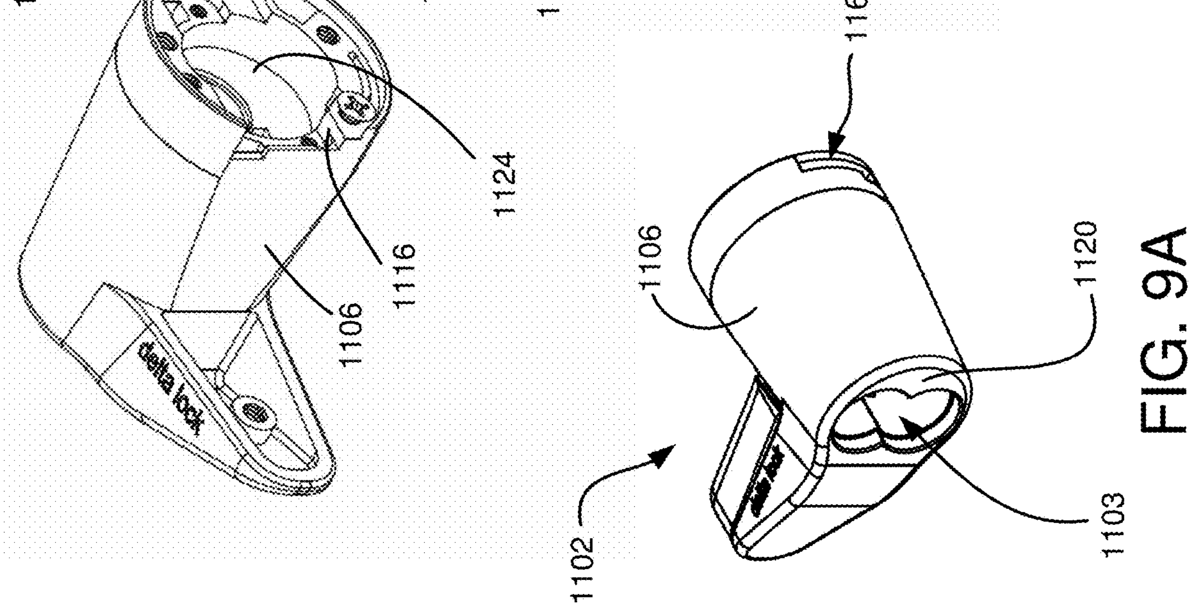
FIG. 9A is a perspective view of a ratchet type locking device in accordance with an embodiment of the present disclosure.

Referring to FIGS. 9A and 9B, an anti-shim ratchet lock assembly 1102 in accordance with another embodiment of the present disclosure is generally depicted. It is to be appreciated that locking assembly 1102 may be employed with various locking bars such as locking bars 103, 115 shown in FIGS. 1B and 1C. The lock mechanism 1102 includes a housing 1106 having a front surface 1120 configured to receive a locking actuation member, e.g., an interchangeable core cylinder (not shown), in aperture 1103, i.e., the interchangeable core cylinder is front-loaded.

The rear portion 1122 of housing 1106 includes a bore 1124 configured to receive a first driver 1125. The first driver 1125 includes first and second prongs 1126, 1128 to be coupled with the locking actuation member, e.g., an interchangeable core cylinder, disposed in the housing 1106. The first driver 1125 further includes a first cam 1130 for providing a transmission force to a second driver 1112. As will be described in relation to FIGS. 10A-10B, the second driver 1112 includes a groove or channel on a rear surface configured to accept the first cam 1130. The second driver 1112 further includes a second cam 1132 and third cam 1133 for actuating spring 1134 which is configured to engage the serrated edge 113 of the locking bar 103. A bracket 1136 secures the first and second drivers 1125, 1112 into the housing 1106 via screws 1138. An end plate 1108 is coupled to the housing 1106 via screws 1140. It is to be appreciated that the rear portion 1122 of the housing includes first and second recesses 1114, 1116 creating a passageway 1161 with the end plate 1108 to allow the locking bar 1104 to pass through the lock mechanism 1102 when fully assembled. Additionally, a bumper 1135 is secured to the housing 1106 via screw 1137.

Figure 10B:
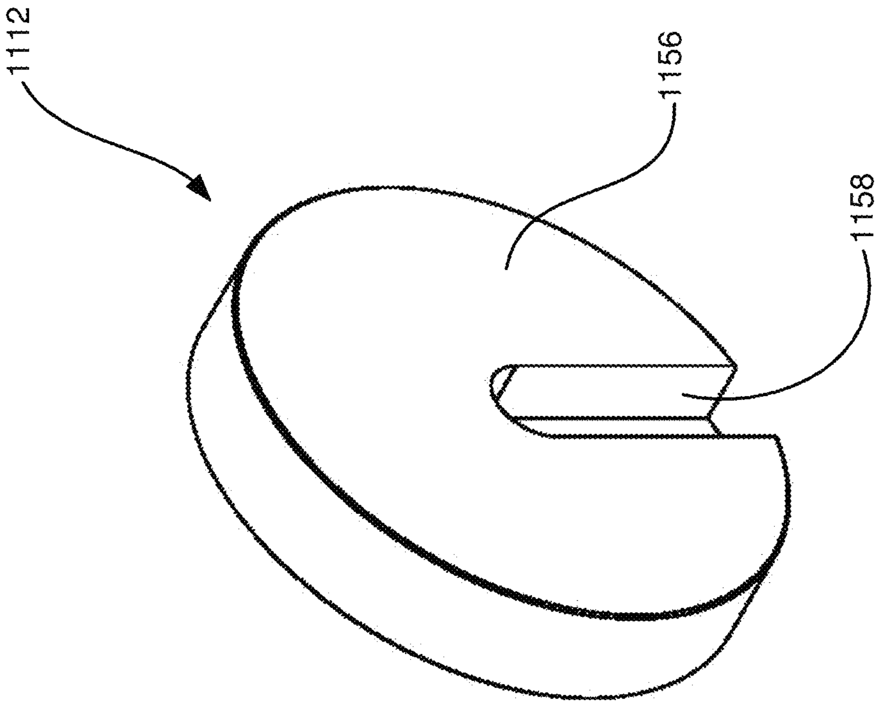
FIG. 10B is a rear, perspective view of the driver shown n FIG. 10A.
Figure 10A:
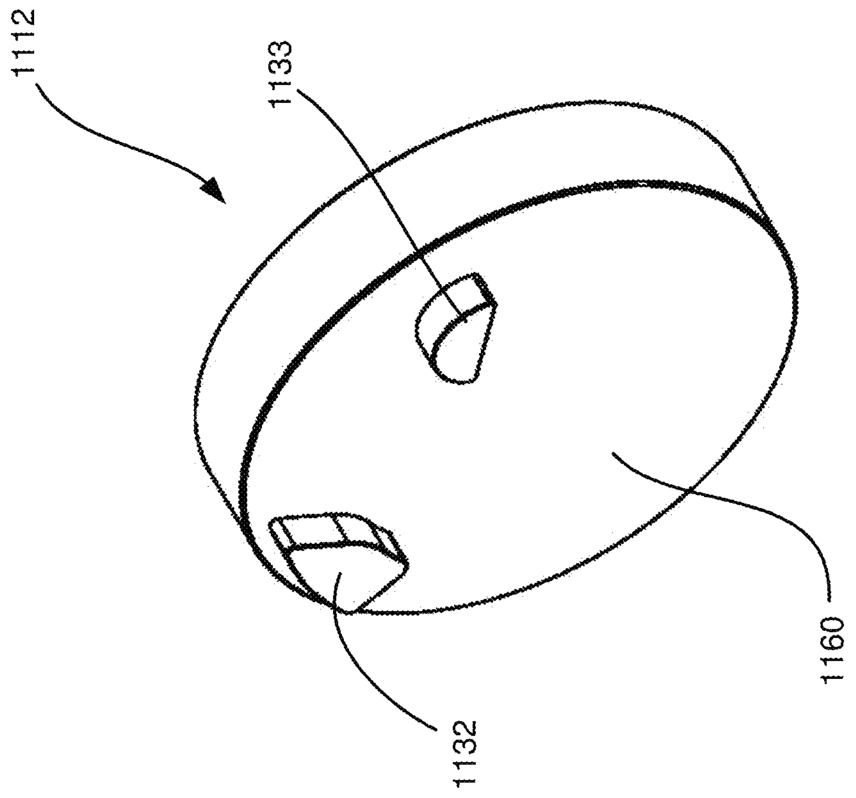
FIG. 10A is a front, perspective view of a driver for the ratchet type locking device of FIGS. 9A and 9B in accordance with the present disclosure.

By providing the second driver 1112 in accordance with the present disclosure as shown in FIGS. 10A-10B, the motion, or rotation, of the control key disposed in a keyway of the locking actuation member, e.g., a interchangeable core cylinder, is extended to approximately 180 degrees. Referring to FIGS. 10A-10B, the second driver 1112 includes a first surface 1156 having a groove or channel 1158 and a second surface 1160 including the second cam 1132 (e.g., a wedge-shaped cam) and third cam 1133 (e.g., a semicircular-shaped cam). It is to be appreciated that although the second cam 1132 is illustrated as a wedge-shaped cam and the third cam 1133 is illustrated as a semicircular-shaped cam, the second and third cams may take other shapes and/or forms and still be within the scope of the present disclosure.

In operation, the first cam 1130 of first driver 1125 will ride in channel 1158 to actuate the second driver 1112 in a rotatable motion. By allowing the keyway of the lower cylinder to rotate about 180 degrees, the interchangeable core may be rekeyed without removing the core from the housing. In the various embodiments of the present disclosure, the operating key and the rekeying key will both move at least about 180 degrees.

Figure 11A:
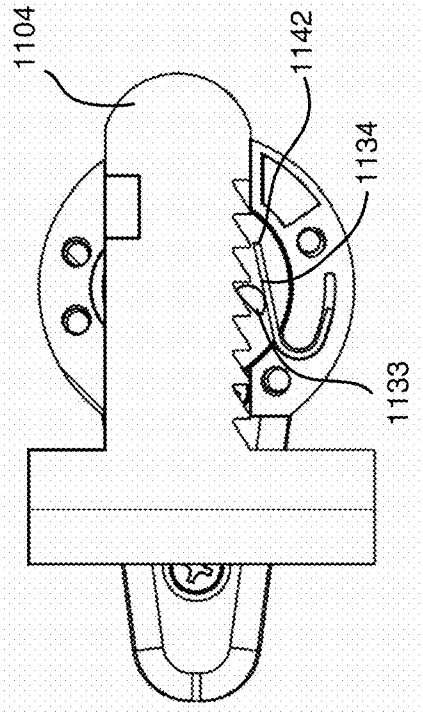
FIG. 11A illustrates a rear view of the ratchet type locking device of FIGS. 9A and 9B in an open position with a locking bar in accordance with the present disclosure.
Figure 11B:
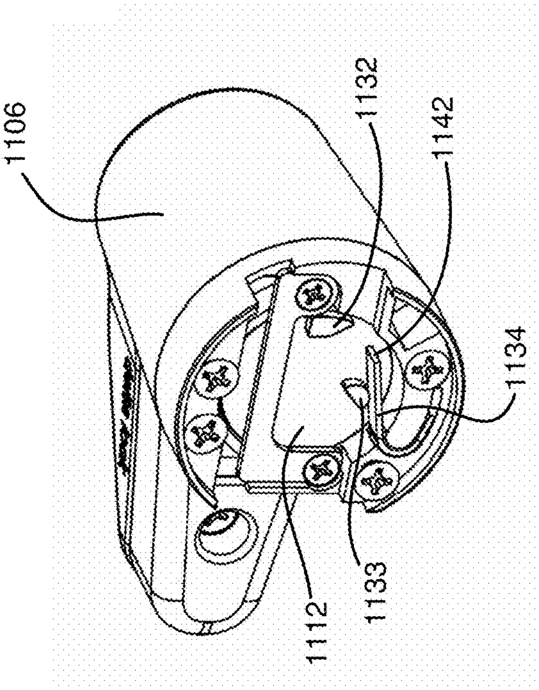
FIG. 11B illustrates the locking assembly as shown in FIG. 11A with the locking bar removed.
Figure 11C:
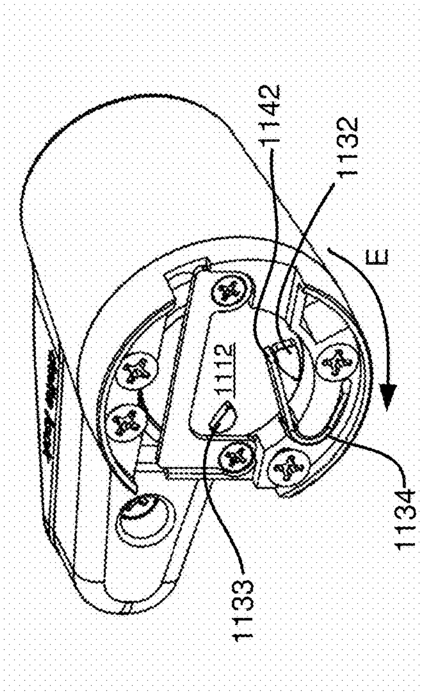
FIG. 11C illustrates a rear view of the ratchet type locking assembly of FIGS. 9A and 9B in an locked position with the locking bar removed in accordance with the present disclosure.
Figure 11D:
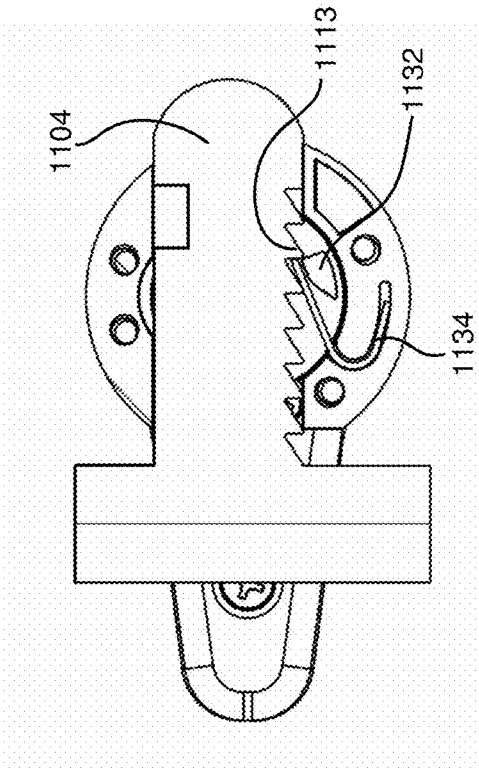
FIG. 11D illustrates the locking assembly as shown in FIG. 11C with the locking bar in place.

Referring to FIGS. 11A-11D, several views of the operation of the second driver 1112 are illustrated, where FIGS. 11A and 11D illustrate operation with a locking bar 1104 in place and FIGS. 11B and 11C illustrate operation of the driver 1112 with the locking bar 1104 removed. It is to be appreciated that end plate 1108 is removed to illustrate the operation of the spring 1134 and second driver 1112.

As the key cylinder of the interchangeable core cylinder is rotated, the semicircular side of the third cam 1133 engages the spring 1134, as shown in FIGS. 11A and 11B, to bias the edge 1142 of the spring 1134 from the serrated edge 1107, allowing unlocking of the locking mechanism. This allows free movement of the locking bar 1104 to withdraw the locking bar from the locking housing 1106. It is to be appreciated that conventional ratchet locks may be bypassed by inserting a shim in recess 1116 to bias the edge 1142 of the spring 1134 from the serrated edge 1107 in a similar fashion as with cam 1133. However, by providing cam 1132, access to spring 1134 will be denied preventing the bypassing of the ratchet lock as will be described below.

A view of the locked state is shown in FIGS. 11C and 11D, which illustrate an unbiased position of the spring 1134. As the key is rotated, driver 1112 is rotated in direction of arrow E, where cam 1133 moves away from spring 1134. In this position, an edge 1142 of the spring 1134 is in position to selectively engage the serrated edge 1107 of the locking bar 1104. Upon further rotation, the second cam 1132 is disposed on a side of the spring 1134 opposite the side making contact with the locking bar 104. As shown in FIGS. 11C and 11D, the tapered end of the wedge-shaped cam 1132 will be urged under the edge 1142 of spring 1134, and subsequently, the edge 1142 will ride on an upper tapered surface of cam 1132 until the edge 1142 is locked into a tooth 1113 of bar 1104 and held in place by cam 1132. In this manner, the second cam 1132 locks the spring 1134 in place preventing a shim to be placed in one of the recesses 1114, 1116 to move spring 1134 and enable removal of the locking device 1102.

It is to be appreciated that the housing and barrel of the present disclosure may take many forms and shapes and is not to be limited to the embodiments shown herein.

It is to be appreciated that the various features shown and described are interchangeable, that is a feature shown in one embodiment may be incorporated into another embodiment.

While the disclosure has been shown and described with reference to certain preferred embodiments thereof, it will be understood by those skilled in the art that various changes in form and detail may be made therein without departing from the spirit and scope of the disclosure. For example, while a key removable core and SFIC core have been shown and described, it is to be appreciated that the present disclosure contemplates using other various types of locking actuation members such as cores and/or cylinders including, but not limited to, large format interchangeable cores, full size interchangeable cores, a fixed cylinder, a key removable core (KRC), a Keymatic or tubular core, etc. It is further to be appreciated that the housings and drivers in accordance with the spirit of the present disclosure may be modified to incorporate future or to-be-invented cores and/or cylinders. In addition to cores and/or cylinders, the present disclosure contemplates that the housings and drivers in accordance with the spirit of the present disclosure may be modified to incorporate future or to-be-invented locking actuation members that function similarly to cores and/or cylinders.

Figure 12A:
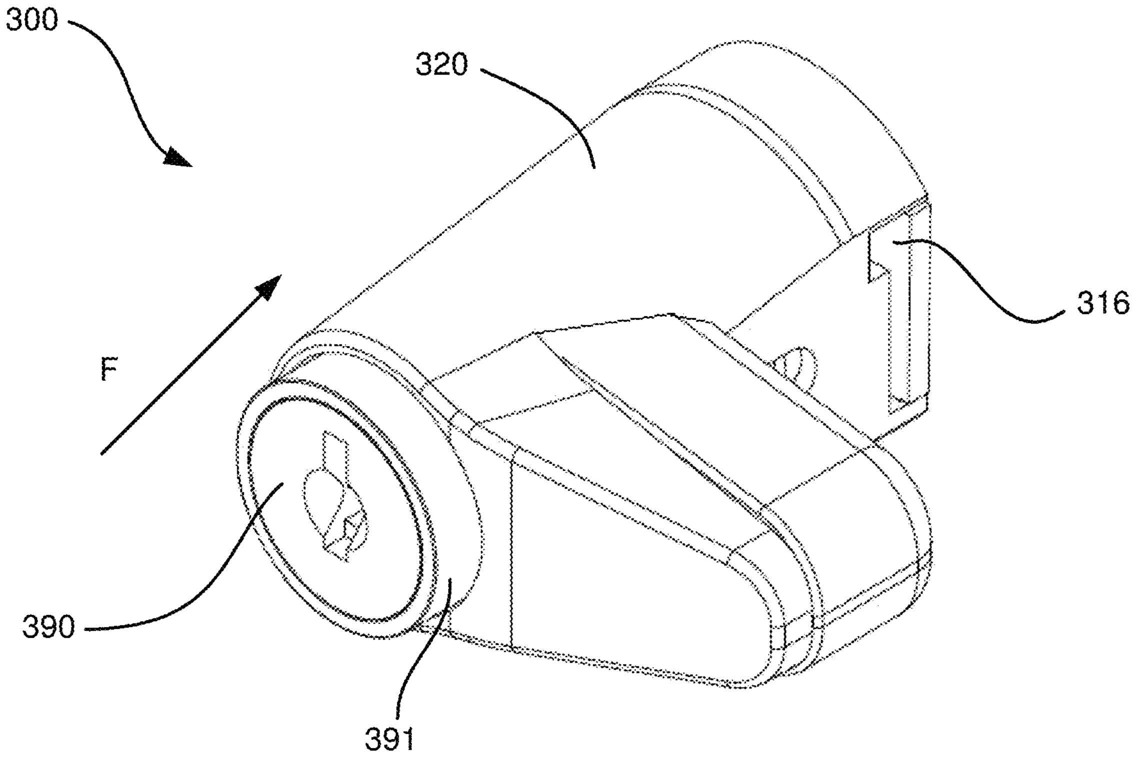
FIG. 12A is a perspective view of a plunger-type locking device in an unlocked position in accordance with another embodiment of the present disclosure.
Figure 12B:
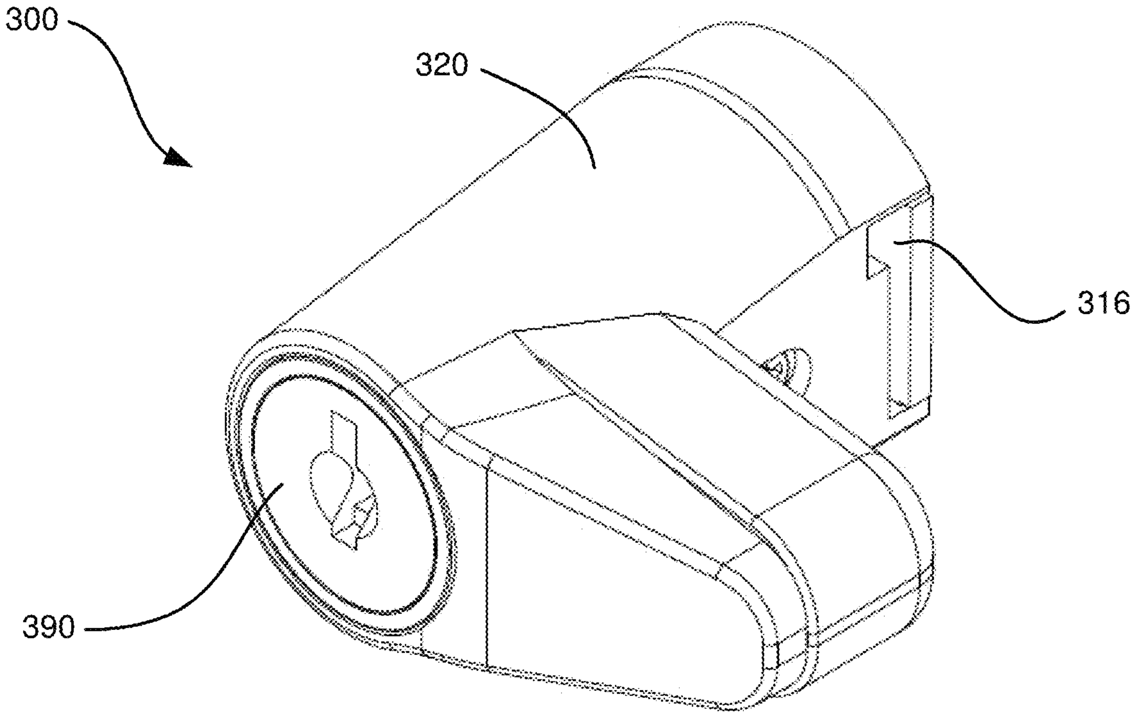
FIG. 12B is a perspective view of the locking device shown in FIG. 12A in a locked position.

Referring to FIGS. 12A-13B, two such examples of the possible locking actuation members are illustrated. In FIG. 12A-B, a plunger-type ratchet locking device 300 is illustrated with a key removable core (KRC) 390. FIG. 12A illustrates an unlocked state of locking device 300, where locking actuation member 390 is disposed in housing 320 and urged into an unlocked position by a spring or other elastic member (not shown) disposed in the housing. In the unlocked state, a projection of any of the above-described plunger barrels is withdrawn from interacting with a locking bar so the locking bar may be removed and/or inserted into the housing 320. After a locking bar is inserted into the housing 320 via recess 316 or opposing recess (not shown), the locking actuation member 390 and barrel 391 are urged in direction F, wherein projection of plunger barrel 391 is inserted into an aperture of the locking bar to positively lock the locking device 300, as shown in FIG. 12B. When the locking bar is required to be removed, an appropriate key is inserted into locking actuation member 390 enabling the locking actuation member 390 and barrel 391 to be urged in away from the locking bar and returning to the unlocked state as shown in FIG. 12A.

Figure 13A:
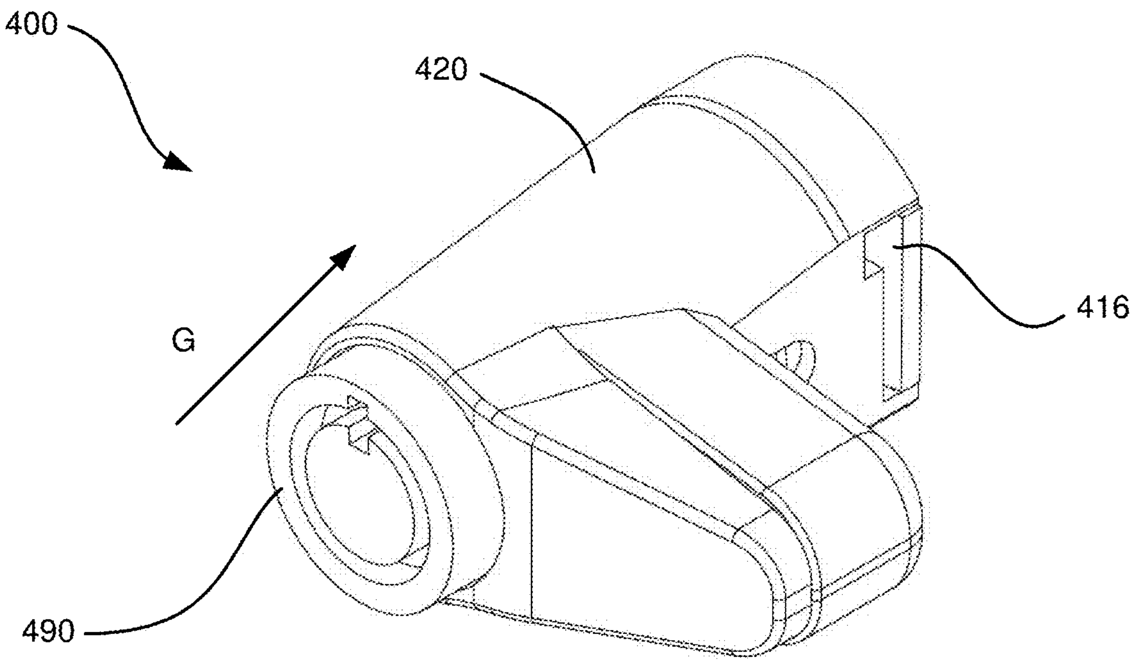
FIG. 13A is a perspective view of a plunger-type locking device in an unlocked position in accordance with a further embodiment of the present disclosure.
Figure 13B:
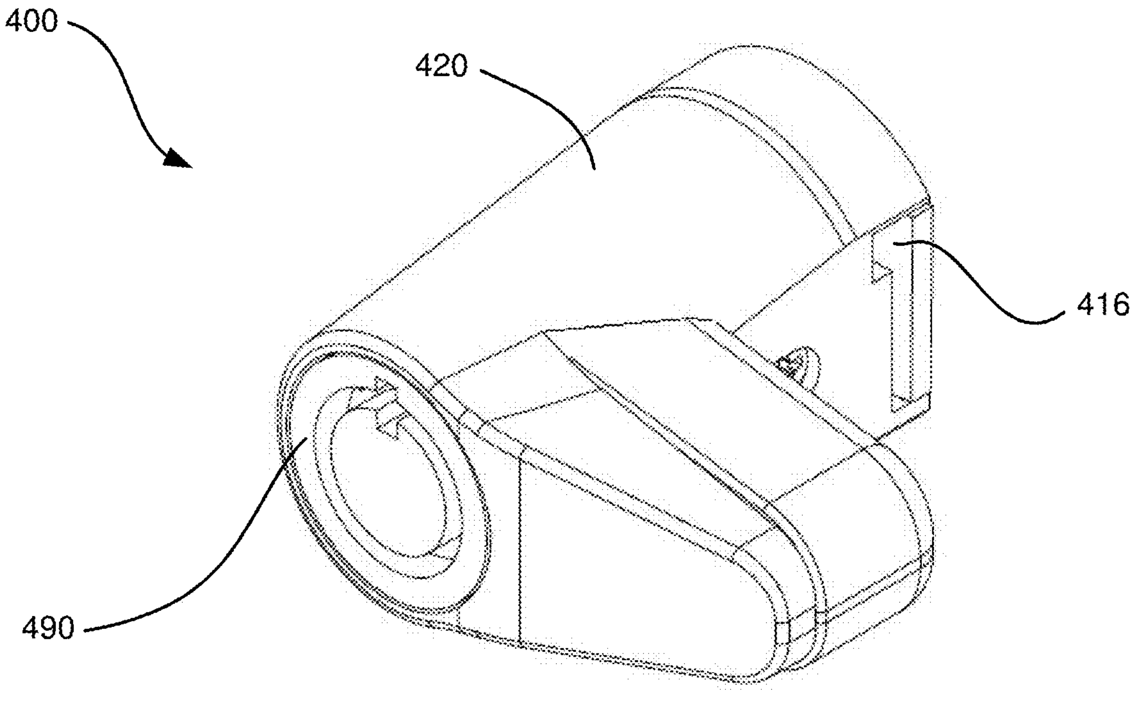
FIG. 13B is a perspective view of a locking device shown in FIG. 13B in a locked position.

In FIG. 13A-B, a plunger-type ratchet locking device 400 is illustrated with a keymatic or tubular core 490. FIG. 13A illustrates an unlocked state of locking device 400, where locking actuation member 490 is disposed in housing 420 and urged into an unlocked position by a spring or other elastic member (not shown) disposed in the housing. In the unlocked state, a projection of any of the above-described plunger barrels is withdrawn from interacting with a locking bar so the locking bar may be removed and/or inserted into the housing 420. After a locking bar is inserted into the housing 420 via recess 416 or opposing recess (not shown), the locking actuation member 490 is urged in direction G, wherein projection of plunger barrel is inserted into an aperture of the locking bar to positively lock the locking device 400, as shown in FIG. 13B. When the locking bar is required to be removed, an appropriate key is inserted into locking actuation member 490 enabling the locking actuation member 490 to be urged in away from the locking bar and returning to the unlocked state as shown in FIG. 13A.

Furthermore, although the foregoing text sets forth a detailed description of numerous embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term ' ' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

What is claimed is:

1. A locking device, comprising:

a housing including a first end and a second end, the housing extending from the first end to the second end along a longitudinal axis, the housing further including an outer wall defining a hollow interior of the housing;

a barrel including a first end and a second end, the second end of the barrel disposed through the first end of the housing into the hollow interior of the housing such that the barrel is slidable along the longitudinal axis, the barrel further including an outer wall defining a hollow interior, the first end of the barrel configured to receive a locking actuation member such that the locking actuation member is retained in the hollow interior of the barrel;

an elastic member to bias the barrel toward the first end of the housing; and a projection coupled to the second end of the barrel, wherein when the barrel is moved toward the second end of the housing, the projection is configured to mate with a locking bar disposed in the second end of the housing.

2. The locking device of claim 1, wherein the locking bar includes a serrated edge and the projection includes at least one corresponding tooth.

3. The locking device of claim 2, wherein the second end of the housing includes a recess, the recess configured to retain a resilient detent, the resilient detent configured to properly align the locking bar disposed in the second end of the housing.

4. The locking device of claim 1, wherein the locking bar includes a serrated edge and the projection is configured in a triangular shape.

5. The locking device of claim 1, wherein the locking bar includes at least one aperture and the projection is configured in a triangular shape, where the projection is disposed in the at least one aperture in a locked state.

6. The locking device of claim 1, wherein the locking bar includes at least one aperture and the projection is configured in a rectangular shape, where the projection is disposed in the at least one aperture in a locked state.

7. The locking device of claim 1, wherein the locking bar includes at least one aperture and the projection is configured in a cylindrical shape, where the projection is disposed in the at least one aperture in a locked state.

8. The locking device of claim 1, wherein the locking bar includes at least one aperture and the projection is configured in a corresponding shape of the at least one aperture, where the projection is disposed in the at least one aperture in a locked state.

9. The locking device of claim 1, wherein the housing further includes a member which extends perpendicularly to the longitudinal axis of housing and a first bumper coupled to the member, the member and bumper configured to stabilize the locking device when mounted to a sliding glass door of a display cabinet.

10. The locking device of claim 9, wherein the first bumper is removable and replaceable with a second bumper having a different width than a width of the first bumper.

11. The locking device of claim 1, wherein the second end of the housing includes at least two recesses and the locking device further comprising a plate disposed over the second end of the housing creating a passageway with the recesses to receive the locking bar.

12. The locking device of claim 11, wherein the plate includes an aperture configured to receive at least a portion of the projection when the barrel is slidably advanced along the longitudinal axis toward the second end of the housing.

13. The locking device of claim 1, wherein the projection is repositionably coupled to the second end of the barrel.

14. The locking device of claim 1, wherein the locking actuation member is an interchangeable core, a fixed cylinder, a key removable core (KRC) and/or a tubular core.

15. A locking assembly comprising:

a housing including a front portion and a rear portion, the front portion including an aperture revealing an interior of the housing, the rear portion including a recess;

a locking actuation member disposed through the aperture and mounted within the interior of the housing, the locking actuation member including a keyway;

a locking bar received by the recess of the housing, the locking bar including a serrated edge;

an elastic member configured such that, in an unbiased state, the elastic member selectively engages the serrated edge of the locking bar;

a first driver coupled to the locking actuation member and including a first cam; and a second driver including a first surface and a second surface, the first surface opposite to the second surface, the first surface including a groove configured to receive the first cam, the second surface including a second cam and a third cam extending therefrom, wherein when an operating key is inserted into the keyway and rotated the first cam rides in the groove of the second driver to rotate the second driver and, when the second driver is rotated in a first direction, the second cam makes contact with the elastic member to bias the elastic member into the serrated edge of the locking bar securing the locking bar to the housing, and when the second driver is rotated in a second direction, the third cam makes contact with the elastic member to bias the elastic member away from the serrated edge of the locking bar to allow the locking bar to be withdrawn from the housing.

16. The locking assembly of claim 15, wherein the second cams is a wedge-shaped cam, a tapered end of the wedge-shaped cam being urged under an edge of the elastic member wherein the edge rides on an upper tapered surface of the second cam until the edge is locked into a tooth of the locking bar and held in place by the second cam.

17. The locking assembly of claim 16, wherein the third cam is a semicircular-shaped cam, the semicircular side of the third cam engages the elastic member to bias the edge of the elastic member from the serrated edge allowing unlocking of the locking mechanism.

18. The locking device of claim 15, wherein the housing further includes a member which extends perpendicularly to the longitudinal axis of housing and a first bumper coupled to the member, the member and bumper configured to stabilize the locking device when mounted to a sliding glass door of a display cabinet.

19. The locking device of claim 18, wherein the first bumper is removable and replaceable with a second bumper having a different width than a width of the first bumper.

20. The locking device of claim 15, wherein the locking actuation member is an interchangeable core, a fixed cylinder, a key removable core (KRC) and/or a tubular core.

* * * * *